US008260232B2

(12) United States Patent
Kim et al.

(10) Patent No.: US 8,260,232 B2
(45) Date of Patent: Sep. 4, 2012

(54) MOBILE TERMINAL AND METHOD OF CONTROLLING BROADCAST THEREIN

(75) Inventors: Seong Nam Kim, Seoul (KR); Beom Seok Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 377 days.

(21) Appl. No.: 12/372,443

(22) Filed: Feb. 17, 2009

(65) Prior Publication Data

US 2009/0286466 A1 Nov. 19, 2009

(30) Foreign Application Priority Data

May 16, 2008 (KR) .................. 10-2008-0045444

(51) Int. Cl.
*H04B 1/18* (2006.01)
(52) U.S. Cl. ............... 455/186.1; 455/185.1; 455/179.1
(58) Field of Classification Search ............. 455/186.1, 455/185.1, 179.1
See application file for complete search history.

(56) References Cited

U.S. PATENT DOCUMENTS

| 6,340,997 | B1 | 1/2002 | Borseth | |
| 7,369,825 | B2 * | 5/2008 | Slupe | 455/161.3 |
| 2001/0044284 | A1 * | 11/2001 | Odashima et al. | 455/186.1 |
| 2003/0032399 | A1 * | 2/2003 | Slupe | 455/161.2 |
| 2006/0053458 | A1 | 3/2006 | Borseth | |
| 2008/0039037 | A1 * | 2/2008 | Kum | 455/186.1 |
| 2008/0055156 | A1 * | 3/2008 | Banerjee | 342/357.06 |

FOREIGN PATENT DOCUMENTS

| CN | 1801904 | 7/2006 |
| EP | 1 003 333 | 5/2000 |
| EP | 1 139 574 | 10/2001 |
| WO | WO 2007/034899 | 3/2007 |
| WO | WO 2007/107177 | 9/2007 |

OTHER PUBLICATIONS

European Search Report dated Apr. 6, 2010.
"Digital Video Broadcasting (DVB); IP Datacast over DVB-H, Implementation Guidelines for Mobility"; ETSI TS 102 611, V1.1.1 (Oct. 2007), European Broadcasting Union.
European Search Report dated Mar. 9, 2011 for Application No. 09 004 583.2.
Chinese Office Action for Application No. 200910128732.8 dated Jun. 23, 2011 and English translation.
Summons to attend oral proceedings dated Jan. 24, 2012 for application 09004583.2.
Christine M. DiLapi et al.; "Potential Frequency Bands for Terrestrial Mobile Multimedia Broadcasting Applications;" IEEE Transactions on Broadcasting, IEEE Service Center, Piscataway, NJ, vol. 53, No. 1, Mar. 1, 2007, pp. 412-417.

* cited by examiner

*Primary Examiner* — Quan Tra
(74) *Attorney, Agent, or Firm* — KED & Associates, LLP

(57) ABSTRACT

A mobile terminal and method of controlling a broadcast therein are provided by which a broadcast signal can be received and outputted in a manner of setting a frequency band corresponding to a visited country in case of international roaming of the mobile terminal. A memory may store per-country broadcast relevant information and a controller may search the memory for broadcast relevant information corresponding to a visited country in case of detecting international migration. The controller may set the searched broadcast relevant information when the search for the broadcast relevant information corresponding to the visited country is successful.

15 Claims, 23 Drawing Sheets

(a)

(b)

(a)

(b)

(a)

(b)

(a)

(b)

(a)

(b)

(c)

(d)

(a)

(b)

(a)

(b)

MOBILE TERMINAL AND METHOD OF CONTROLLING BROADCAST THEREIN

This application claims priority from Korean Patent Application No. 10-2008-0045444, filed May 16, 2008, the subject matter of which is incorporated herein by reference.

BACKGROUND

1. Field

Embodiments of the present invention may relate to a mobile terminal and a method of controlling a broadcast therein.

2. Background

A mobile terminal may perform various functions. Examples of such functions may include data and voice communications, capturing images and video via a camera, recording audio, playing music files via a speaker system, and displaying images and video on a display. Mobile terminals may include additional functionality that support game playing, and mobile terminals may be configured as multimedia players. Mobile terminals may receive broadcast and multicast signals that permit viewing of content such as videos and television programs.

Efforts are ongoing to support and increase functionality of mobile terminals. The efforts may include software and hardware improvements, as well as changes and improvements in structural components that form the mobile terminal.

A frequency band for transmitting a broadcasting signal to a mobile terminal may be set differently depending on a specific country. A mobile terminal may receive a broadcast signal only if a frequency band of a visited country is set when performing international roaming.

Unless broadcast reception and output software is modified into the software suitable for a visited country in case of international roaming, a mobile terminal may be unable to receive a broadcast signal as well as set a frequency band of the visited country.

BRIEF DESCRIPTION OF THE DRAWINGS

Arrangements and embodiments may be described in detail with reference to the following drawings in which like reference numerals refer to like elements and wherein.

DETAILED DESCRIPTION

Embodiments of the present invention may provide a mobile terminal and method of controlling a broadcast therein, by which a broadcast signal can be received and outputted in a manner of setting a frequency band corresponding to a visited country in case of international roaming of the mobile terminal.

A mobile terminal may be provided that includes a memory storing per-country broadcast relevant information and a controller searching the memory for broadcast relevant information corresponding to a visited country in case of detecting international migration. The controller may set the searched broadcast relevant information when the search for the broadcast relevant information corresponding to the visited country is successful.

A method may be provided for controlling a broadcast in a mobile terminal. This may include detecting a migration from one country to another country, searching previously stored per-country broadcast relevant information for broadcast relevant information corresponding to the visited country, and setting the searched broadcast relevant information when the search for the broadcast relevant information corresponding to the visited country is successful as a result of the searching.

Figure 1:
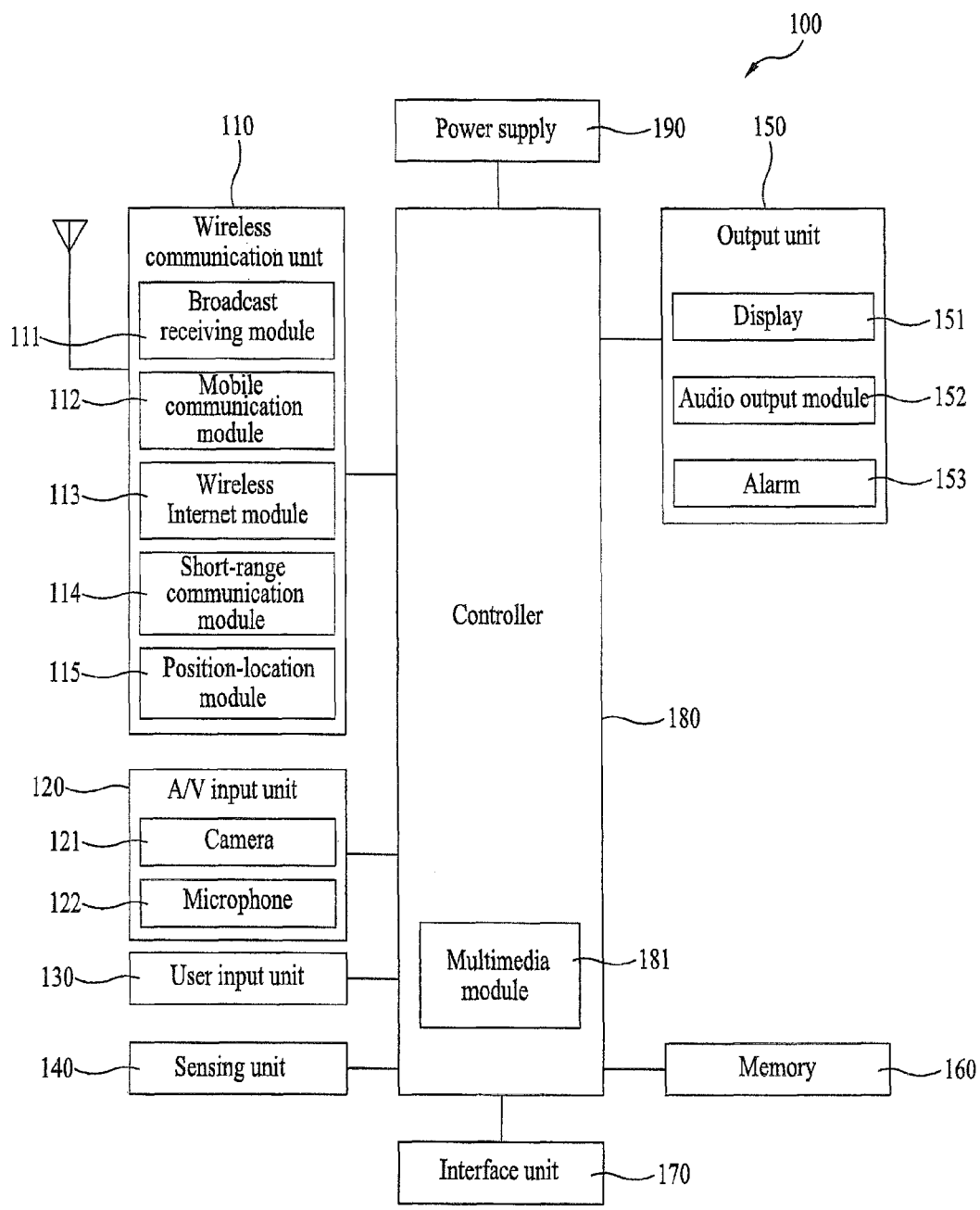
FIG. 1 is a block diagram of a mobile terminal in accordance with an example embodiment.

FIG. 1 is a block diagram of mobile terminal in accordance with an example embodiment. Other embodiments, arrangements and configurations may also be provided. The mobile terminal may be implemented using a variety of different types of mobile terminals. Examples of such mobile terminals include mobile phones, user equipment, smart phones, computers, digital broadcast mobile terminals, personal digital assistants, portable multimedia players (PMP) and/or navigators. By way of a non-limiting example, a further description may be provided with regard to a mobile terminal. However, such teachings may apply to other types of mobile terminals. FIG. 1 shows a mobile terminal having various components, although other components may also be used. More or less components may alternatively be implemented.

FIG. 1 shows that a mobile terminal 100 includes a wireless communication unit 110, an audio/video (A/V) input unit 120, a user input unit 130, a sensing unit 140, an output unit 150, a memory 160, an interface unit 170, a controller 180 and a power supply 190.

The wireless communication unit 110 may be configured with several components and/or modules. FIG. 1 shows that a wireless communication unit 110 may include a broadcast receiving module 111, a mobile communication module 112, a wireless Internet module 113, a short-range communication module 114 and a position-location module 115. The wireless communication unit 110 may include one or more components that permit wireless communication between the mobile terminal 100 and a wireless communication system or network within which the mobile terminal is located.

The broadcast receiving module 111 may receive a broadcast signal and/or broadcast associated information from an external broadcast managing entity via a broadcast channel. The broadcast channel may include a satellite channel and a terrestrial channel. The broadcast managing entity may be a system that transmits a broadcast signal and/or broadcast associated information. Examples of broadcast associated information include information associated with a broadcast channel, a broadcast program, a broadcast service provider, etc. For example, broadcast associated information may include an electronic program guide (EPG) of digital multimedia broadcasting (DMB) and electronic service guide (ESG) of digital video broadcast-handheld (DVB-H).

The broadcast signal may be a TV broadcast signal, a radio broadcast signal, and/or a data broadcast signal. The broadcast signal may further include a broadcast signal combined with a TV or radio broadcast signal.

The broadcast receiving module 111 may receive broadcast signals transmitted from various types of broadcast systems. As a non-limiting example, the broadcasting systems may include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and/or integrated services digital broadcast-terrestrial (ISDB-T). The receiving of multicast signals may also be provided. Data received by the broadcast receiving module 111 may be stored in the memory 160, for example.

The mobile communication module 112 may transmit/receive wireless signals to/from one or more network entities (e.g., base station, Node-B). The signals may represent audio, video, multimedia, control signaling, and data, etc.

The wireless Internet module 113 may support Internet access for the mobile terminal 100. The wireless Internet module 113 may be internally or externally coupled to the mobile terminal 100.

The short-range communication module 114 may facilitate short-range communications. Suitable technologies for implementing this module may include radio frequency identification (RFID), infrared data association (IrDA), ultra-wideband (UWB), as well as networking technologies such as Bluetooth and ZigBee.

The position-location module 115 may identify or otherwise obtain a location of the mobile terminal 100. The position-location module 115 may be provided using global positioning system (GPS) components that cooperate with associated satellites, network components, and/or combinations thereof.

The audio/video (A/V) input unit 120 may provide audio or video signals input to the mobile terminal 100. The A/V input unit 120 may include a camera 121 and a microphone 122. The camera 121 may receive and process image frames of still pictures and/or video.

The microphone 122 may receive an external audio signal while the mobile terminal is in a particular mode, such as a phone call mode, a recording mode and/or a voice recognition mode. The received audio signal may then be processed and converted into digital data. The mobile terminal 100, and in particular the A/V input unit 120, may include a noise removing algorithm (or a noise canceling algorithm) to remove noise generated in the course of receiving the external audio signal. Data generated by the A/V input unit 120 may be stored in the memory 160, utilized by the output unit 150, and/or transmitted via one or more modules of the wireless communication unit 110. Two or more microphones and/or cameras may also be provided.

The user input unit 130 may generate input data responsive to user manipulation of an associated input device or devices. Examples of such devices may include a keypad, a dome switch, a touchpad (e.g., static pressure/capacitance), a jog wheel and/or a jog switch. A specific example is one in which the user input unit 130 is configured as a touchpad in cooperation with a touch screen display, as will be described below.

The sensing unit 140 may provide status measurements of various aspects of the mobile terminal 100. For example, the sensing unit 140 may detect an open/close status (or state) of the mobile terminal 100, a relative positioning of components (e.g., a display and a keypad) of the mobile terminal 100, a change of position of the mobile terminal 100 or a component of the mobile terminal 100, a presence or absence of user contact with the mobile terminal 100, an orientation or acceleration/deceleration of the mobile terminal 100, etc.

The mobile terminal 100 may be configured as a slide-type mobile terminal. In such a configuration, the sensing unit 140 may sense whether a sliding portion of the mobile terminal 100 is open or closed. The sensing unit 140 may as sense presence or absence of power provided by the power supply 190, presence or absence of a coupling or other connection between the interface unit 170 and an external device, etc.

The interface unit 170 may couple the mobile terminal 100 with external devices, such as wired/wireless headphones, external chargers, power supplies, storage devices configured to store data (e.g., audio, video, pictures, etc.), earphones, and microphones, etc. The interface unit 170 may use a wired/wireless data port, a card socket (e.g., for coupling to a memory card), a subscriber identity module (SIM) card, a user identity module (UIM) card, a removable user identity module (RUIM) card, etc., audio input/output ports and/or video input/output ports, for example.

An identity module may be a chip that stores various kinds of information for identifying or authenticating use authority of the terminal 100. The identity module may include one of a user identity module (UIM), a subscriber identity module (SIM), a universal subscriber identity module (USIM), etc. The identity module may include a module for identifying or authenticating authority for a broadcast purchase and/or a broadcast viewing using the mobile terminal 100. A device provided with the identity module (hereafter an identity device) may be manufactured as a smart card. The identity device may be connected to the mobile terminal 100 via a port for connecting with the identity device.

The output unit 150 may include various components that support output requirements of the mobile terminal 100. The mobile terminal 100 may also include a display 151 that visually displays information associated with the mobile terminal 100. For example, when the mobile terminal 100 is operating in a phone call mode, the display 151 may provide a user interface or a graphical user interface that includes information associated with placing, conducting, and/or terminating a phone call. As another example, when the mobile terminal 100 is in a video call mode or a photographing mode, the display 151 may additionally or alternatively display images that are associated with these modes.

The display 151 may be configured as a touch screen working in cooperation with an input device, such as a touchpad. This configuration may permit the display 151 to function both as an output device and an input device.

The display 151 may also be implemented using known display technologies including a liquid crystal display (LCD), a thin film transistor-liquid crystal display (TFT-LCD), an organic light-emitting diode display (OLED), a flexible display and a three-dimensional display, for example. The mobile terminal 100 may include one or more displays. A two-display embodiment may include an internal display (viewable when the mobile terminal is in an opened position) and an external display (viewable in both open and closed positions).

A proximity sensor (not shown) may also be provided within the touch screen and/or around the touch screen. The proximity sensor may also be provided within the sensing unit 140. The proximity sensor may detect a presence or non-presence of an object approaching a prescribed detecting surface or an object existing around the proximity sensor using an electromagnetic field strength or infrared ray without mechanical contact. The proximity sensor may have a durability longer than a contact type sensor and may also have a utility greater than the contact type sensor.

The proximity sensor may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, etc.

An example of the radio frequency oscillation proximity sensor may now be explained. While an oscillation circuit is oscillating a full-wave radio frequency, if an object approaches in a vicinity of the sensor detecting surface, an oscillation amplitude of the oscillation circuit may attenuate or stop. Such a variation may be converted to an electric signal to detect a presence or non-presence of the object. Therefore, even if a different substance (except a metallic substance) is placed between the radio frequency oscillation proximity sensor and the object, the proximity sensor may detect an object without interference with the different substance.

If the touch screen is an electrostatic type, the proximity sensor may detect proximity of a pointer using a variation of an electric field according to proximity of the pointer.

If the pointer is located in the vicinity of the touch screen despite not contacting the touch screen, the position of the pointer and a distance between the pointer and the touch screen may be detected. An action that the pointer approaches without contacting the touch screen may be called a 'proximity touch'. An action that a pointer actually touches the touch screen may be called a 'contact touch'. The position on the touch screen proximity-touched by the pointer may be the position of the pointer that vertically opposes the touch screen when the pointer performs the proximity touch.

The proximity sensor may detect a proximity touch and a proximity touch pattern (e.g., a proximity touch distance, a proximity touch duration, a proximity touch position, a proximity touch shift state, etc.). Information corresponding to the detected proximity touch action and the detected proximity touch pattern may be outputted to the touch screen.

FIG. 1 shows the output unit 150 having an audio output module 152 that supports audio output requirements of the mobile terminal 100. The audio output module 152 may be implemented using one or more speakers, buzzers, other audio producing devices, and/or combinations thereof. The audio output module 152 may function in various modes including a call-receiving mode, a call-placing mode, a recording mode, a voice recognition mode and/or a broadcast reception mode. During operation, the audio output module 152 may output audio relating to a particular function (e.g., call received, message received, and errors).

The output unit 150 may also include an alarm 153 to signal or otherwise identify occurrence of a particular event associated with the mobile terminal 100. Alarm events may include a call received, a message received and/or a user input received. An example of such an output may include providing tactile sensations (e.g., a vibration) to a user. For example, the alarm 153 may vibrate in response to the mobile terminal 100 receiving a call or a message. As another example, a vibration may be provided by the alarm 153 in response to receiving user input at the mobile terminal 100, and thereby providing a tactile feedback mechanism. The various outputs provided by the components of the output unit 150 may be separately performed, or such output may be performed using any combination of such components.

The memory 160 may store various types of data to support processing, control and storage requirements of the mobile terminal 100. The data may include program instructions for applications operating on the mobile terminal 100, contact data, phonebook data, messages, pictures, video, etc. The memory 160 shown in FIG. 1 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 may control overall operations of the mobile terminal 100. For example, the controller 180 may perform control and processing associated with voice calls, data communications, video calls, camera operations and recording operations. The controller 180 may include a multimedia module 181 that provides multimedia playback. The multimedia module 181 may be part of the controller 180, or may be implemented as a separate component.

The controller 180 may perform pattern recognizing processing for recognizing a handwriting input on the touch screen as a character or for recognizing a picture drawing input on the touch screen as an image.

The power supply 190 may provide power required by the various components for the mobile terminal. The provided power may be internal power, external power, and/or combinations thereof.

Arrangements and embodiments may be implemented in a computer-readable medium using, for example, computer software, hardware, and/or some combination thereof For a hardware implementation, the above-described arrangements and embodiments may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, and/or a selective combination thereof. Arrangements and embodiments may also be implemented by the controller 180.

For a software implementation, the above described arrangements may be implemented with separate software modules, such as procedures and functions, each of which may perform one or more of the functions and operations described herein. The software codes may be implemented with a software application written in any suitable programming language and may be stored in memory (e.g., the memory 160), and executed by a controller or processor (e.g., the controller 180).

The mobile terminal 100 may also be implemented in a variety of different configurations, such as a folder-type, a slide-type, a bar-type, a rotational-type, a swing-type and/or a combination thereof The following disclosure will primarily relate to a slide-type mobile terminal. However, the teachings apply to other types of mobile terminals.

Figure 2A:
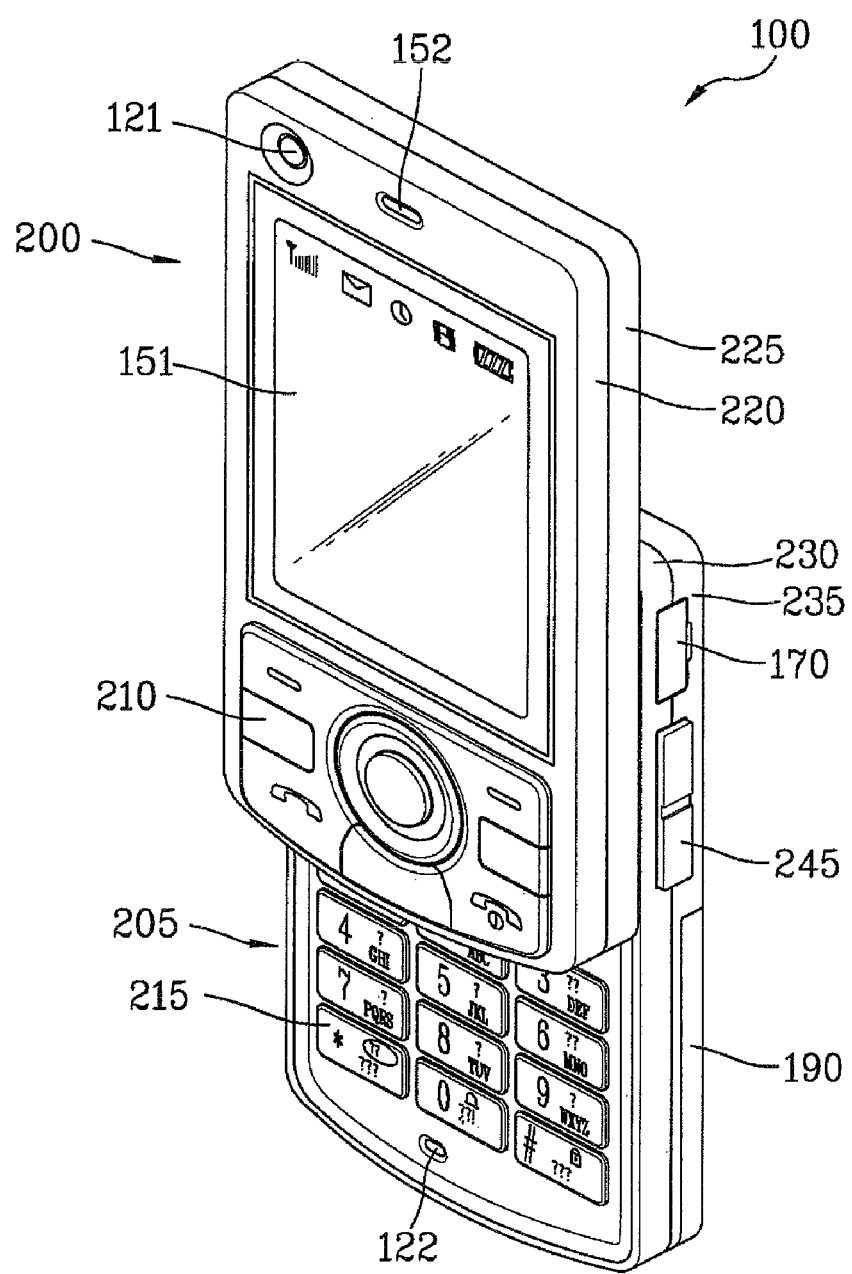
FIG. 2A is a perspective view of a front of a mobile terminal according to an example embodiment.

FIG. 2A is a perspective view of a front of a mobile terminal according to an example embodiment. Other embodiments, arrangements and configurations may also be provided. FIG. 2A shows that the mobile terminal 100 has a first body 200 that is configured to slidably cooperate with a second body 205. The user input unit 130 may be implemented using function keys 210 and a keypad 215. The function keys 210 may be associated with the first body 200, and the keypad 215 may be associated with the second body 205. The keypad 215 may include various keys (e.g., numbers, characters, and symbols) to enable a user to place a call, prepare a text or multimedia message, and/or otherwise operate the mobile terminal 100.

The first body 200 may slide relative to the second body 205 between an open position (or open state) and a closed position (or closed state). In the closed position, the first body 200 is positioned over the second body 205 in such a manner that the keypad 215 is substantially or completely obscured by the first body 200. In the open position, a user may access the keypad 215 as well as the display 151 and the function keys 210. The function keys 210 may be convenient to a user for entering commands such as start, stop and/or scroll.

The mobile terminal 100 may operate in either a standby mode (e.g., able to receive a call or message, receive and respond to network control signaling) or an active call mode. The mobile terminal 100 may function in the standby mode when in the closed position, and may function in the active mode when in the open position. The mode configuration may change as required or as desired.

The first body 200 may be formed from a first case 220 and a second case 225. The second body 205 may be formed from a first case 230 and a second case 235. The first and second cases may be formed from a suitably ridge material such as injection molded plastic, or the first and second cases may be formed using metallic material such as stainless steel (STS) and titanium (Ti).

One or more intermediate cases may be provided between the first and second cases of one or both of the first body 200 and the second body 205. The first and second bodies 200, 205 may be sized to receive electronic components necessary to support operation of the mobile terminal 100.

The first body 200 may have the camera 121 and/or the audio output unit 152, which may be configured as a speaker, positioned relative to the display 151. The camera 121 may be constructed such that it can be selectively positioned (e.g., rotated, swiveled, etc.) relative to the first body 200.

The function keys 210 may be positioned adjacent to a lower side of the display 151. The display 151 may be an LCD or an OLED. The display 151 may also be configured as a touch screen having an underlying touchpad that generates signals responsive to user contact (e.g., finger, stylus, etc.) with the touch screen.

The second body 205 may have the microphone 122 positioned adjacent to the keypad 215, and side keys 245 (i.e., one type of a user input unit) positioned along the side of the second body 205. The side keys 245 may be configured as hot keys, such that the side keys 245 are associated with a particular function of the mobile terminal 100. The interface unit 170 may be positioned adjacent to the side keys 245, and the power supply 190 in a form of a battery may be located on a lower portion of the second body 205.

Figure 2B:
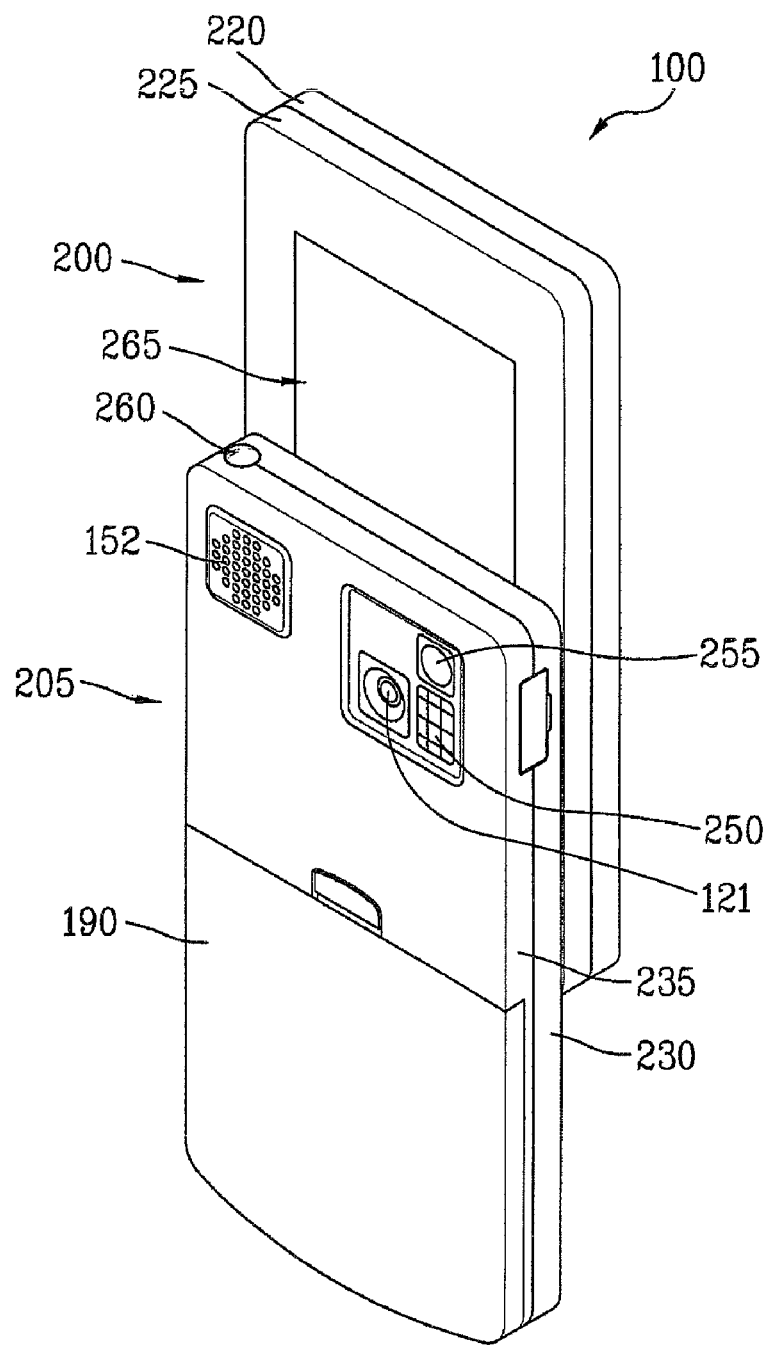
FIG. 2B is a rear view of the mobile terminal shown in FIG. 2A.

FIG. 2B is a rear view of the mobile terminal shown in FIG. 2A. FIG. 2B shows the second body 205 having the camera 121, a flash 250 and a mirror 255. The flash 250 may operate in conjunction with the camera 121 of the second body 205. The mirror 255 may assist a user to position the camera 121 in a self-portrait mode. The camera 121 of the second body 205 may face a direction that is opposite to a direction faced by the camera 121 of the first body 200 (FIG. 2A). Each of the cameras 121 of the first and second bodies 200, 205 may have the same or different capabilities.

The camera of the first body 200 may operate with a relatively lower resolution than the camera of the second body 205. This may work well during a video conference, for example, in which reverse link bandwidth capabilities may be limited. The relatively higher resolution of the camera of the second body 205 (FIG. 2B) may be useful for obtaining higher quality pictures for later use or for communicating to others.

The second body 205 may include the audio output module 152 configured as a speaker. The audio output module 152 may be located on an upper side of the second body 205. The audio output modules of the first and second bodies 200, 205 may cooperate to provide stereo output. Either or both of the audio output modules may operate as a speakerphone.

A broadcast signal receiving antenna 260 may be located at an upper end of the second body 205. The antenna 260 may function in cooperation with the broadcast receiving module 111. The antenna 260 may be fixed or configured to retract into the second body 205. The rear side of the first body 200 may include a slide module 265 that slidably couples with a corresponding slide module located on the front side of the second body 205.

The illustrated arrangement of the various components of the first and second bodies 200, 205 may be modified. Some or all of the components of one body may alternatively be implemented on the other body. In addition, location and relative positioning of such components may not be critical to many embodiments, and the components may be positioned at locations that differ from those shown by the representative figures.

Figure 3A:
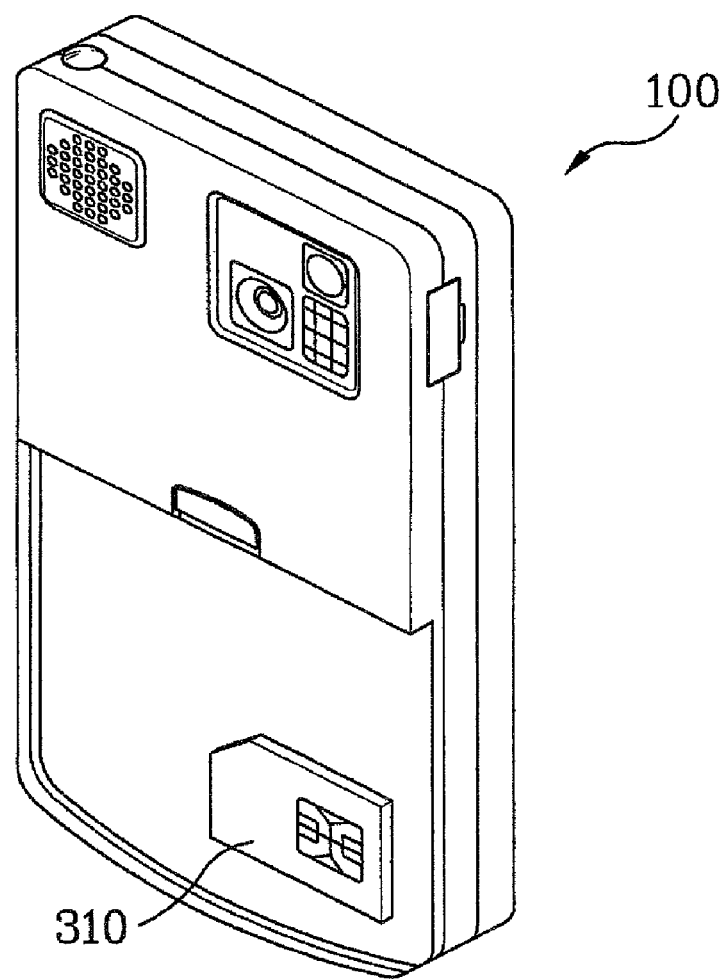
FIGS. 3A and 3B are diagrams showing an identity device that is detached from a mobile terminal according to an example embodiment.
Figure 3B:
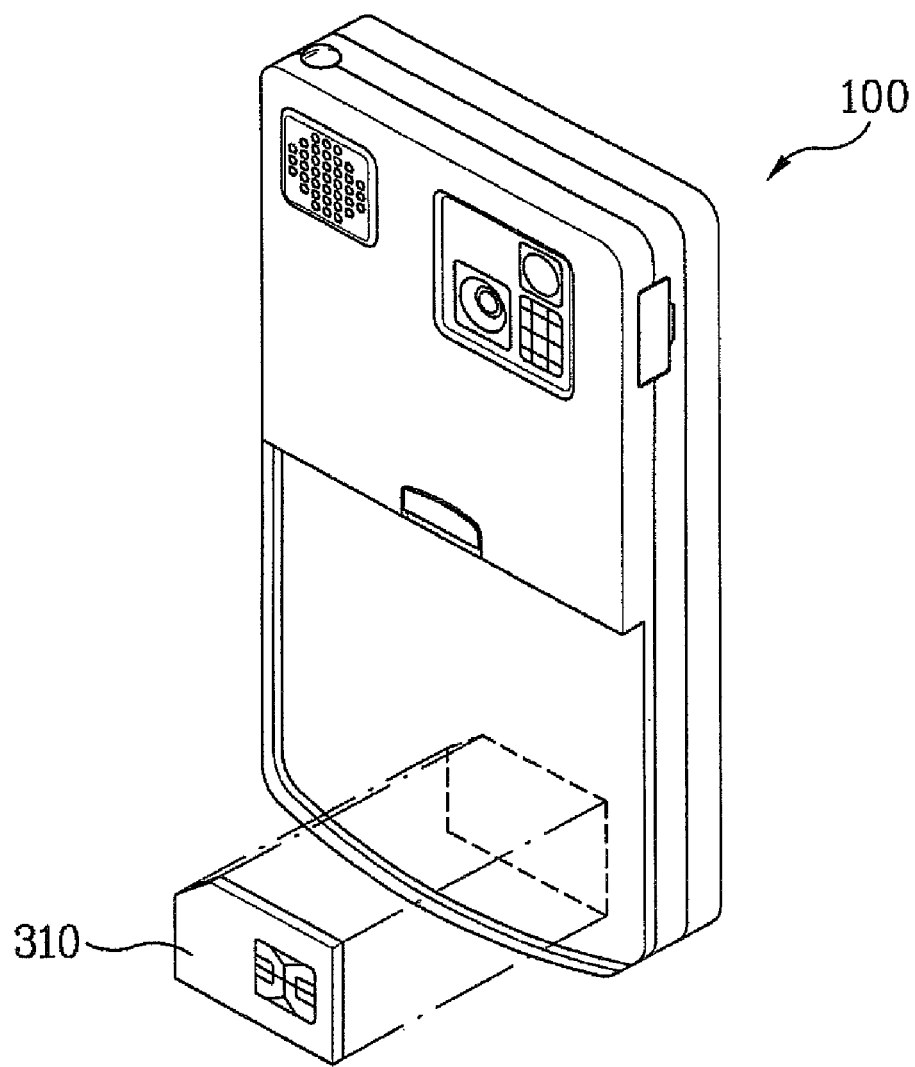

FIG. 3A and FIG. 3B are diagrams showing an identity device that is detached from a mobile terminal according to an example embodiment. Other embodiments, arrangements and configurations may also be provided. An identity device 310 may include an SIM card, for example.

The identity device 310 may be detachably provided to the mobile terminal 100. A new identity device may be loaded in the mobile terminal 100 by replacing an old identity device. The identity device 310 may be loaded in the mobile terminal 100 by being combined with the interface unit 170. The identity device 310 may be provided to the mobile terminal 100 by being connected to a connector separately provided for the connection with the identity device 310.

A connecting means (not shown) for connecting the identity device 310 and the mobile terminal 100 may be provided to any one of a backside, lateral sides, a front side and the like of the mobile terminal 100.

The mobile terminal 100 may be operable in a wire/wireless communication system, a satellite based communication system and/or a communication system capable of transmitting data carried on frames or packets.

The mobile terminal 100 may operate within a communication system that transmits data via frames or packets, including both wireless and wireline communication systems, and/or satellite-based communication systems. Such communication systems may utilize different air interfaces and/or physical layers.

Examples of such air interfaces utilized by the communication systems may include frequency division multiple access (FDMA), time division multiple access (TDMA), code division multiple access (CDMA), a universal mobile telecommunications system (UMTS), a long term evolution (LTE) of the UMTS, and a global system for mobile communications (GSM), for example. The further description may relate to a CDMA communication system, although such teachings apply equally to other types of systems.

Figure 4:
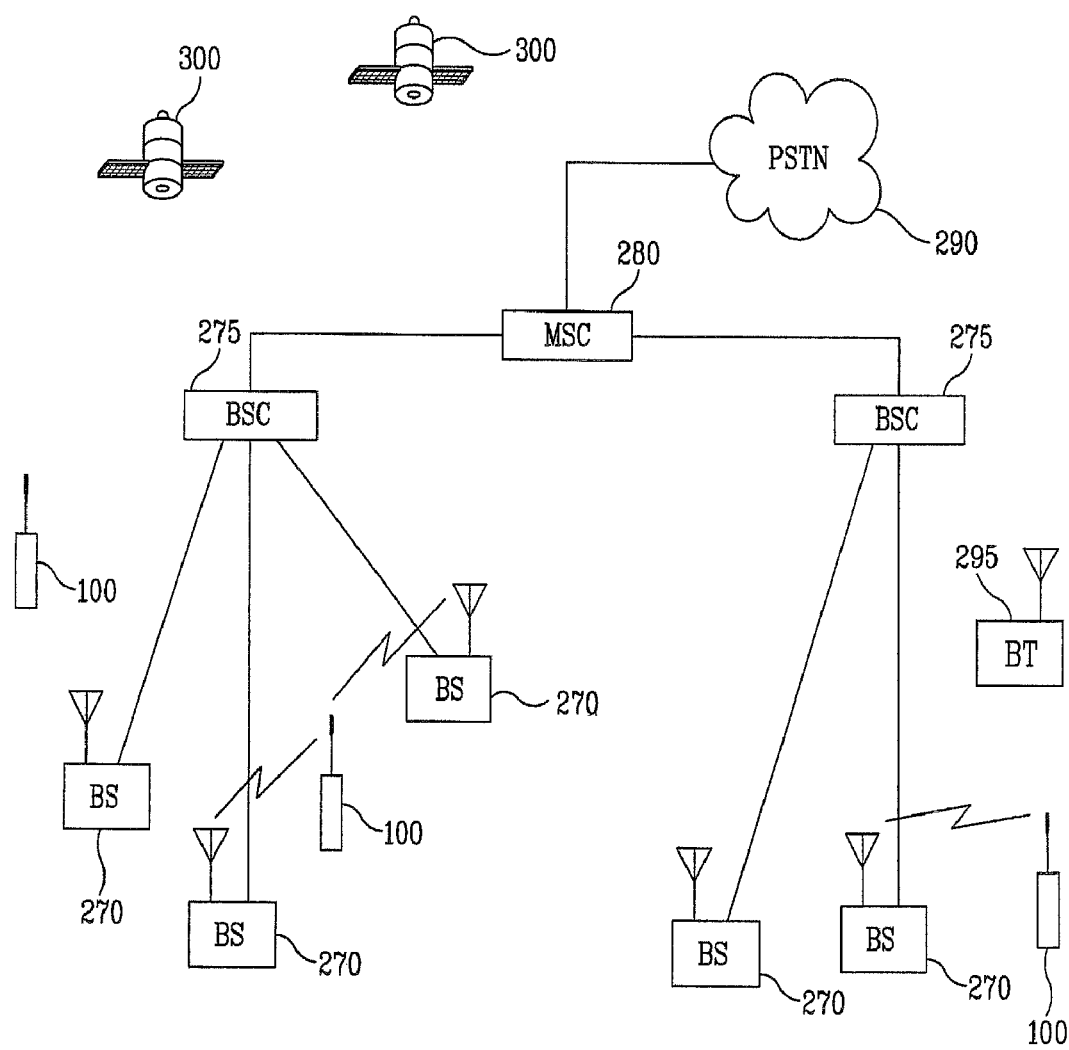
FIG. 4 is a block diagram of a CDMA wireless communication system operable with the mobile terminal of FIGS. 1-3B.

As shown in FIG. 4, a CDMA wireless communication system may include a plurality of mobile terminals 100, a plurality of base stations 270, base station controllers (BSCs) 275, and a mobile switching center (MSC) 280. The MSC 280 may interface with a public switch telephone network (PSTN) 290. The MSC 280 may also interface with the BSCs 275. The BSCs 275 may be coupled to the base stations 270 via backhaul lines. The backhaul lines may be configured in accordance with any of several known interfaces including, for example, E1/T1, ATM, IP, PPP, Frame Relay, HDSL, ADSL, and/or xDSL. The system may include more than two BSCs 275.

Each base station 270 may include one or more sectors, with each sector having an omnidirectional antenna or an antenna pointed in a particular direction radially away from the base station 270. Each sector may include two antennas for diversity reception. Each base station 270 may support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). The term "base station" may collectively refer to a BSC 275, and one or more base stations 270. The base stations may also be denoted "cell sites." Alternatively, individual sectors of a given base station 270 may be referred to as cell sites.

A broadcasting transmitter 295 may send broadcast signals to the mobile terminals 100 operating within the system. The broadcast receiving module 141 (FIG. 1) of the mobile terminal may receive the broadcast signals transmitted by the broadcasting transmitter 295. Similar arrangements may be implemented for other types of broadcast and multicast signaling (as discussed above).

FIG. 4 further shows several global positioning system (GPS) satellites 300. Such satellites facilitate locating the position of some or all of the mobile terminals 100. FIG. 4 shows two satellites, although positioning information may be obtained with greater or fewer satellites. The position-location module 115 (FIG. 1) of the mobile terminal 100 may cooperate with the satellites 300 to obtain desired position information. Other types of position detection technology, (i.e., location technology in addition to or instead of GPS location technology) may alternatively be implemented. Some or all of the GPS satellites 300 may alternatively or additionally provide satellite DMB transmissions.

During operation of the wireless communication system, the base stations 270 may receive sets of reverse-link signals from various mobile terminals 100. The mobile terminals 100 may engage in calls, messaging, and/or other communications. Each reverse-link signal received by a given base station 270 may be processed within that base station 270. The resulting data may be forwarded to an associated BSC 275.

The BSC 275 may provide call resource allocation and mobility management functionality including soft handoffs between the base stations 270. The BSCs 275 may route the received data to the MSC 280, which provides additional routing services for interfacing with the PSTN 290. The PSTN 290 interfaces with the MSC 280, and the MSC interfaces with the BSCs 275, which in turn control the base stations 270 to transmit sets of forward-link signals to the mobile terminal 100.

Figure 5:
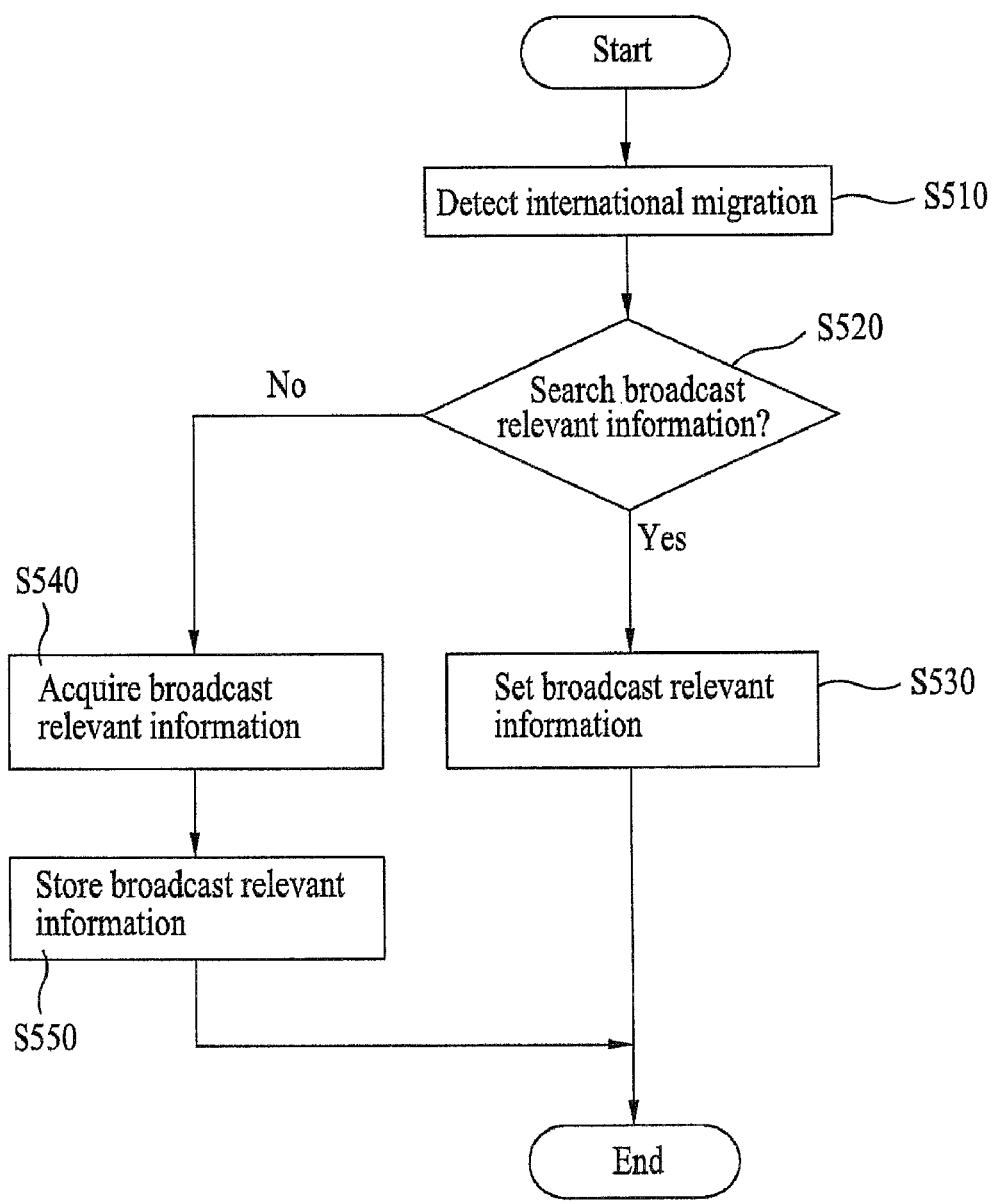
FIG. 5 is a flowchart for a method of controlling a broadcast in a mobile terminal according to an example embodiment of the present invention.
Figure 6:
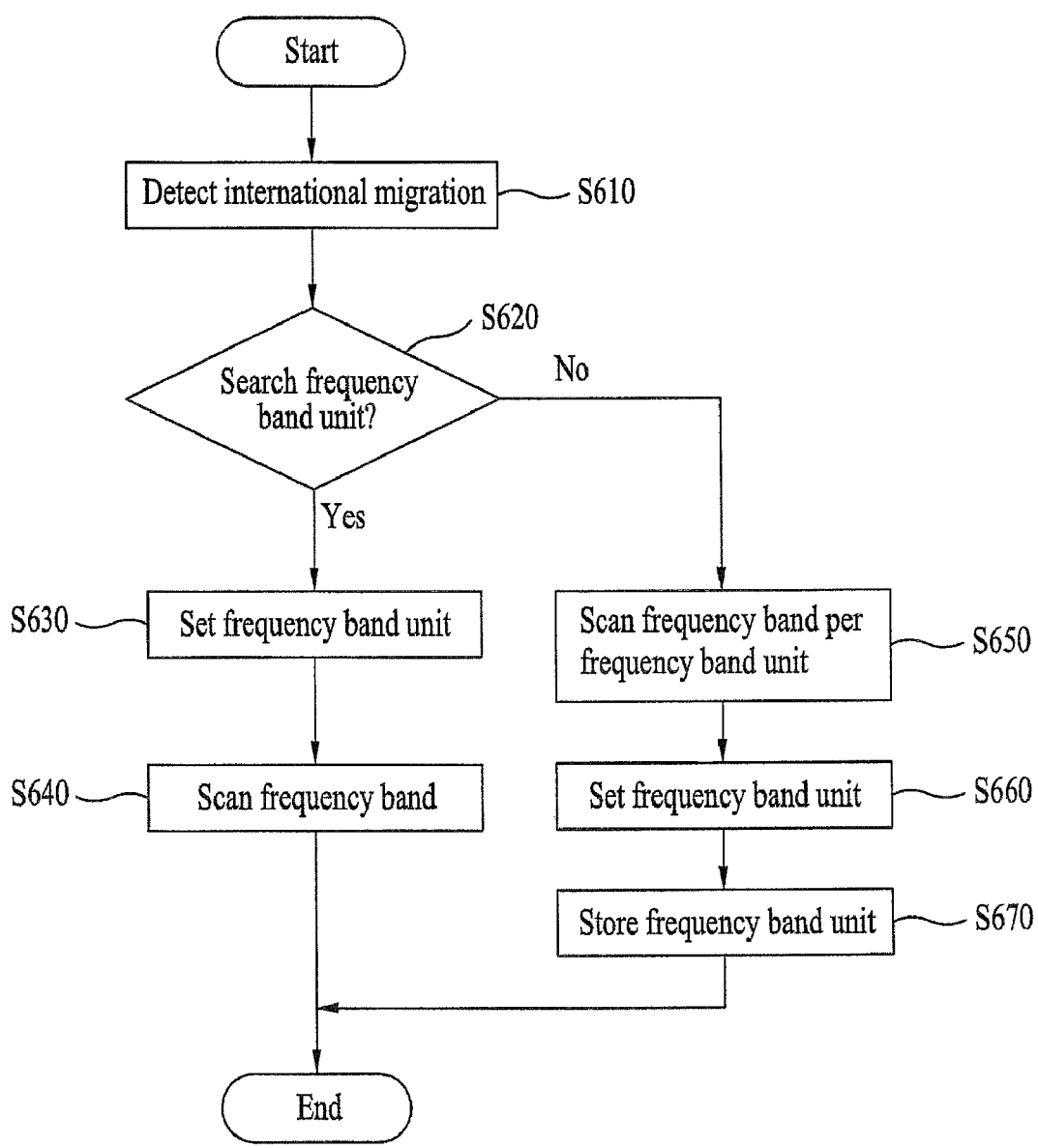
FIG. 6 is a flowchart for a method of controlling a broadcast in a mobile terminal when broadcast relevant information is a frequency band unit according to an example embodiment of the present invention.

A broadcast controlling method in a mobile terminal may be explained with reference to FIG. 5 and FIG. 6. FIG. 5 is a flowchart for a method of controlling a broadcast in a mobile terminal according to an example embodiment of the present invention. FIG. 6 is a flowchart for a method of controlling a broadcast in a mobile terminal when the broadcast relevant information is a frequency band unit according to an example embodiment of the present invention. Other operations, orders of operations and embodiments may also be within the scope of the present invention.

As shown in FIGS. 5-6, the mobile terminal 100 may detect international migration from one country to another country in operation S510 (FIG. 5) or in operation S610 (FIG. 6). The detecting of the international migration may be performed using per-country identification information including at least one selected from the group consisting of mobile country identification information per country, country code per country, country GPS information per country and country name per country.

The per-country mobile country identification information may be information for identifying a country on a mobile terminal. A mobile country code (MCC) of DVB-H may correspond to the per-country mobile country identification information. The per-country country code may relate to information for identifying a country on a wire/wireless communication network. The per-country country GPS information may relate to coordinate information for identifying a country using a country location on GPS. The per-country country name may relate to a generic country name.

The mobile terminal 100 may store the per-country identification information in the memory 160 or receive the per-country identification information via a network such as a broadcasting network, a mobile communication network, internet, a short-range communication network, a GPS network and the like using the wireless communication unit 110. The mobile terminal 100 may compare identification information before a predetermined timing point to identification information after the predetermined timing point. If the former and latter identification information differ from each other, the mobile terminal 100 may detect international migration.

For example, in acquiring the former and latter identification information with reference to the predetermined timing point, the mobile country identification information may be received when a request signal is transmitted (as will be explained below). The country code may be acquired from the memory 160 by the controller 180 in case of international migration. The country GPS information may be acquired by the position-location module 115. The country name may be inputted by a user through the user input unit 130.

The mobile terminal 100 may detect the international migration by comparing the acquired identification information to the per-country identification information stored in the memory 160 or received via the wireless communication unit 110.

The detecting operation S510/S610 may be performed periodically or randomly by the mobile terminal 100. The detecting operation S510/S610 may also be performed when one of the following occurs: a broadcast mode entry, a power-on of the mobile terminal, a user selection operation input and a broadcast viewing unavailability.

The above description is made based on the assumption of international migration. Embodiments may be applicable to all inter-region migrations that use broadcast relevant information (explained below) as well as to the international migration. The per-country identification information may be replaced by per-region identification information. The per-country broadcast relevant information may be replaced by per-region broadcast relevant information.

If the international migration is detected in the detecting operation S510, the mobile terminal 100 may, in operation S520, search the per-country broadcast relevant information previously stored in the memory 160 for broadcast relevant information corresponding to the visited country. If the international migration is detected in the detecting operation S610, the mobile terminal 100 may, in operation S620, search the per-country broadcast relevant information previously stored in the memory 160 for broadcast relevant information corresponding to the visited country. The searching operation S520/S620 may be performed by the controller 180.

The per-country broadcast relevant information may include at least one selected from the group consisting of a per-country settable frequency band unit, per-country broadcast output requirement information and per-country broadcast service provider information.

The frequency band unit may relate to a scan unit of a frequency band assigned for broadcast signal transmission/reception. The frequency band unit may be set differently per country or per region. In order to successfully receive a broadcast signal in case of international (or interregional) migration, a frequency band unit corresponding to a visited country may be set up.

For example, in case of moving to a country 'B' having a frequency band unit '8 MHz' from a country 'A' having a frequency band unit '5 MHz', the mobile terminal 100 may modify the frequency band unit to '8 MHz' to successfully receive a broadcast signal in the country 'B'.

The broadcast output requirement information may be information for enabling a received broadcast signal to be successfully outputted via the mobile terminal 100. The broadcast output requirement information may be set differently per country or per region. In order to successfully output a broadcast signal in case of international (or interregional) migration, broadcast output requirement information corresponding to a visited country may be set up in the mobile terminal 100.

For example, the broadcast output requirement information may include modulation, code rate, guide interval, in-depth interleaver and the like.

The modulation may modify a size, a frequency, a phase and/or the like to enable a low-frequency signal to be carried on a carrier used in transmitting audio, video and/or data. For example, the modulation may be set to 16 quadrature amplitude modulation (QAM), 64 QAM, QPSK (quadrature phase shift keying) and/or the like.

The code rate may be a rate of data to be actually transmitted among whole data to correct an error rate of a signal. The code rate may be set to ½, ⅔, ¾ and/or the like.

The guide interval may be a specific interval allocated to prevent signal interference when a signal of one period is divided into a predetermined number of intervals.

The in-depth interleaver may be a capacity of an interleaver. The in-depth interleaver may be set to a 2k mode, a 4k mode and/or the like.

The broadcast service provider information may be information on a service provider capable of normally providing a broadcast to a mobile terminal in a currently located country. In case of international (or interregional) migration, a broadcast service provider suitable for a visited country may be set up.

For example, the broadcast service provider information may be information for identifying each broadcast service provider. The broadcast service provider information may include a cell ID, a platform ID, a network ID and/or the like.

The per-country broadcast relevant information may be received via a network such as a broadcasting network, a mobile communication network, a short-range wireless communication network and the like and may then be stored in the memory 160. The per-country broadcast relevant information may be stored in the memory 160 in an early stage of manufacturing the mobile terminal 100. The per-country broadcast relevant information may be stored in the memory 160 by a user's direct input. The per-country broadcast relevant information may be stored in the identity device 310 detachably provided to the mobile terminal 100.

The per-country broadcast relevant information may include broadcast relevant information on the above-mentioned identification information (e.g., the mobile country identification information, the country code, the country GPS information, the country name and the like).

The detecting operation S610 and the searching operation S620 correspond to a case that the per-country broadcast relevant information is a per-country frequency band unit.

In searching for the broadcast relevant information corresponding to the visited country in the searching operation S520/S620, the mobile terminal 100 may search the broadcast relevant information corresponding to the identification information on the visited country (i.e., the per-country identification information).

For example, if identification information on a visited country is one of mobile country identification information, a country code, a country GPS information and a country name, the mobile terminal 100 may search the broadcast relevant information matching the corresponding identification information.

If the identification information on the visited country is one of a country code, a country GPS information and a country name, the mobile terminal 100 may acquire identification information on the visited country from the per-country identification information stored in the memory 160 and may then search the broadcast relevant information corresponding to the acquired identification information.

If the identification information on the visited country is the mobile country identification information, the mobile terminal 100 may transmit a request signal for the mobile country identification information on the visited country and then receive the mobile country identification information on the visited country using the wireless communication unit 110. The mobile terminal 100 may search broadcast relevant information corresponding to the received mobile country identification information.

If the identification information on the visited country is the mobile country identification information, the mobile terminal 100 may obtain a country code, country GPS information and/or a country name of the visited country from the per-country identification information stored in the memory. The mobile terminal 100 may also acquire mobile country identification information corresponding to the obtained country code, country GPS information and/or country name, and then search the broadcast relevant information corresponding to the acquired mobile country identification information.

The searching operation S520/S620 may be performed in case of broadcast mode entry, a user's selection action input, broadcast viewing unavailability and/or international migration detection.

For example, the searching operation S520/S620 may not be performed despite the international migration detection or may be performed in case of the international migration detection. Even if the international migration is detected, the searching operation S520/S620 may be performed in case of at least one occurrence of the broadcast mode entry, the user's selection action input and/or the broadcast viewing unavailability.

The searching operation S520/S620 may be performed in a standby mode or an application driven mode (e.g., a mode for call connection, MP3 play, moving picture play, phonebook search, broadcast signal reception/output or the like). The searching operation S520/S620 may also be performed as a background.

As shown in FIG. 5, if the search for the broadcast relevant information corresponding to the visited country is successful ('YES'), the mobile terminal 100 may, in operation S530, set the broadcast relevant information corresponding to the visited country that was searched in the searching operation S520. The setting operation S530 may be performed by the controller 180.

For example, if the searched broadcast relevant information is the broadcast output requirement information, the mobile terminal 100 may set the searched broadcast output requirement information for the visited country. Therefore, the mobile terminal 100 may quickly provide a broadcast to a user despite the international migration in a manner of quickly encoding or decoding a broadcast signal received in the visited country with reference to the searched broadcast output requirement information.

As a result of the searching operation S520, if the search for the broadcast relevant information corresponding to the visited country fails ('NO'), the mobile terminal 100 may acquire the broadcast relevant information corresponding to the visited country in operation S540 and then store the acquired broadcast relevant information in the memory 160 in operation S550.

For example, if the broadcast relevant information is the broadcast requirement information on the visited country, the mobile terminal 100 may receive the broadcast output requirement information on the visited country via various networks using the wireless communication unit 110.

As the acquired broadcast relevant information is stored in the memory 160, the previously stored per-country broadcast relevant information may also be updated.

FIG. 6 shows an example method in which the per-country broadcast relevant information is a frequency band unit that is settable per country. As shown in FIG. 6, as a result of the searching operation S620, if the search for the frequency band unit corresponding to the visited country is successful ('YES'), the mobile terminal 100 may, in operation S630, set a frequency band unit corresponding to the visited country searched in the searching operation S620. The setting operation S630 may be performed by the controller 180.

Subsequently, the mobile terminal 100 may scan, in operation S640, frequency bands based on the frequency band unit set in the setting operation S630.

For example, if the frequency band unit corresponding to the visited country is '5 MHz', the mobile terminal 100 may scan frequency bands by units of 5 MHz using the wireless communication unit 110, and more particularly the broadcast receiving module 111.

As a result of the searching operation S620, if the search for the frequency band unit corresponding to the visited country fails ('NO'), the mobile terminal 100 may scan frequency bands by a unit of each of at least one or more settable frequency bands in operation S650.

For example, if the settable frequency band units are '5 MHz, 6 MHz, 7 MHz and 8 MHz', the mobile terminal 100 may scan frequency bands by each frequency band unit of 5 MHz, 6 MHz, 7 MHz and 8 MHz using the wireless communication unit 110, and more particularly, the broadcast receiving module 111. A scan sequence may be specified by a user of the mobile terminal 100. Alternatively, the scan process may be randomly or sequentially executed. Assuming that the scan sequence corresponds to 5 MHz, 6 MHz, 7 MHz and 8 MHz in order, if the frequency band scan by the unit of 6 MHz is successful, the rest of the frequency band scans by the units of 7 MHz and 8 MHz may not be performed.

As a result of the scanning operation S650, if the frequency band scanning operation by a specific frequency band unit is successful, the mobile terminal 100 may set the frequency band unit for the visited country to the specific frequency band unit in operation S660. The mobile terminal 100 may store, in operation S670, the frequency band unit set in the setting operation S660 in the memory as the frequency band unit for the visited country.

As the set specific frequency band unit is stored in the memory 160, the previously stored per-country settable frequency band unit may be updated.

The above-described setting operation S530/S630 may be performed in case of at least one of broadcast mode entry, a user' selection operation input, broadcast viewing unavailability and/or international migration detection.

Figure 7A:
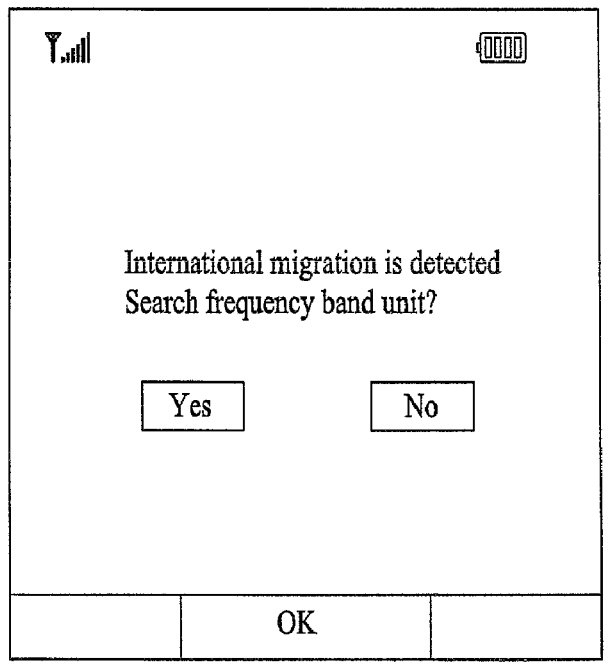
FIGS. 7A and 7B are screen configurations for searching and setting broadcast relevant information in a mobile terminal in case of international roaming according to an example embodiment of the present invention.
Figure 7A:
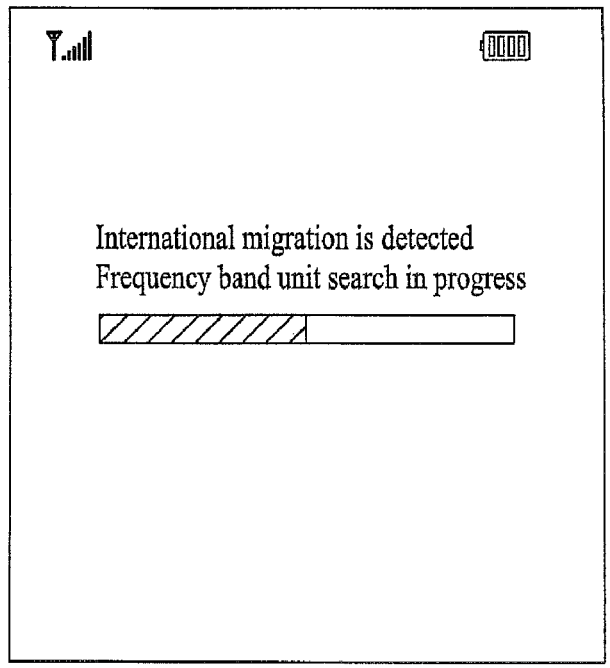
Figure 7B:
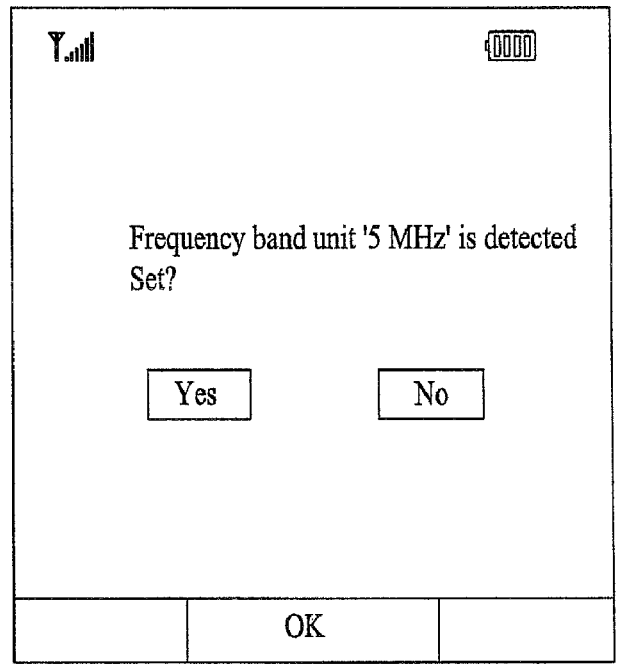
Figure 7B:
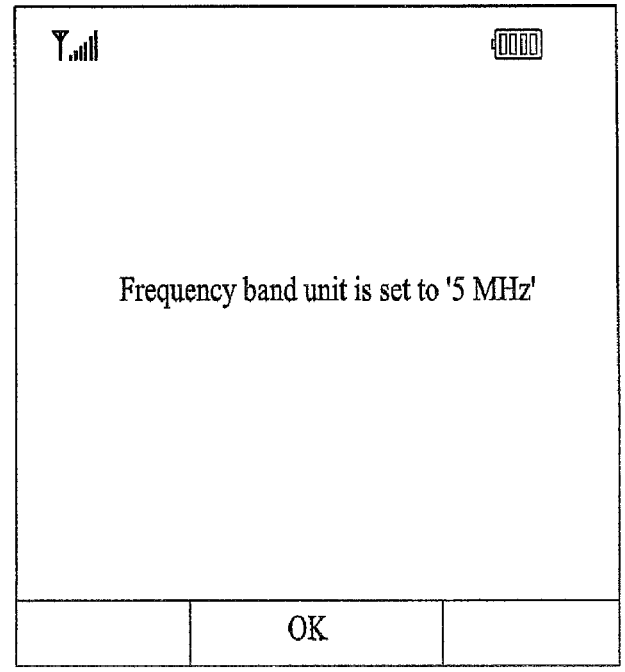

FIG. 7A and FIG. 7B are screen configurations for searching and setting broadcast relevant information in the mobile terminal 100. Other configurations may also be provided. For clarity and ease of description, broadcast relevant information may be limited to a settable frequency band unit.

As shown in (a) of FIG. 7A, in case of detecting international migration, the mobile terminal 100 may display a text to announce detecting of international migration and to enable a user to select whether to search a frequency band unit corresponding to a visited country via the display unit 151.

If a user selects a search command ('YES'), the mobile terminal 100 may search per-country settable frequency band units previously stored in the memory 160 for the frequency band unit corresponding to the visited country and may display an identifier for announcing that the search is in progress and/or for announcing a search extent as shown in (b) of FIG. 7A. The identifier may be in one of various forms such as an icon, an image, a symbol, a text, a progressive bar and/or the like.

In case of detecting the international migration, the mobile terminal 100 may directly enter the mode shown in (b) of FIG. 7A irrespective of whether the user selects the search command of the frequency band unit corresponding to the visited country.

As shown in (a) FIG. 7B, if the search for the frequency band unit corresponding to the visited country is successful, the mobile terminal 100 may display a text to announce success of the frequency band unit search and to enable a user to select whether to set the searched frequency band unit.

If the user selects the setting command ('YES') in (a) of FIG. 7B, the mobile terminal 100 may set the frequency band unit of the visited country to the searched frequency band unit as shown in (b) of FIG. 7B.

If the search for the frequency band unit corresponding to the visited country is successful, the mobile terminal 100 may directly enter the mode shown in (b) of FIG. 7B irrespective of whether the user selected the command for setting the searched frequency band unit.

FIGS. 8A to 10 are screen configurations for searching and setting a frequency band unit in case of international roaming using mobile country identification information in the mobile terminal 100. For clarity and ease of description, broadcast relevant information may be limited to a frequency band unit corresponding to a currently located country (or a visited country).

Figure 8A:
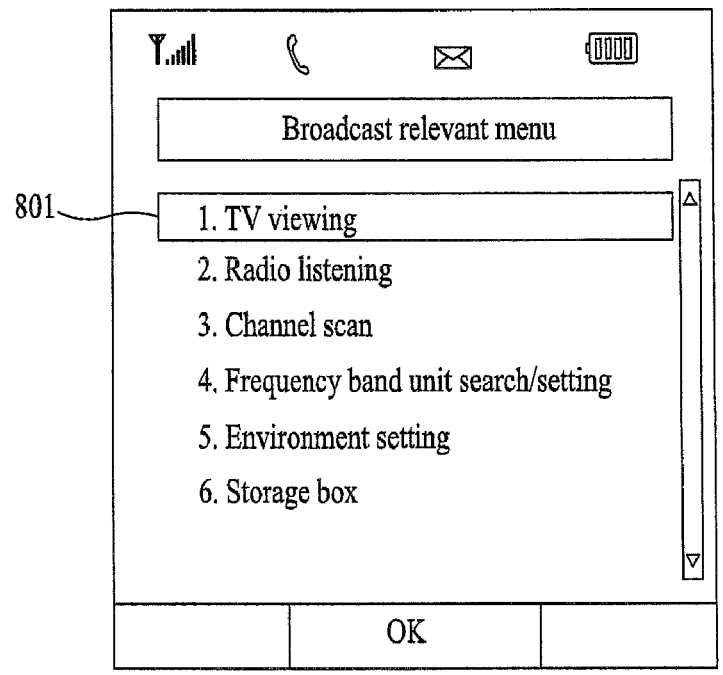
FIGS. 8A, 8B, 8C, 9 and 10 are screen configurations for searching and setting a frequency band unit in case of international roaming using mobile country identification information in a mobile terminal according to an example embodiment of the present invention.
Figure 8B:
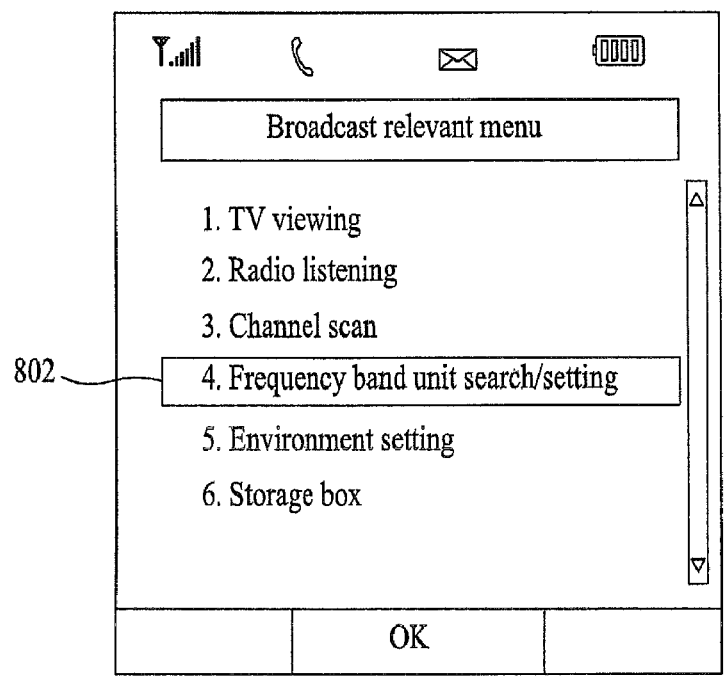
Figure 8C:
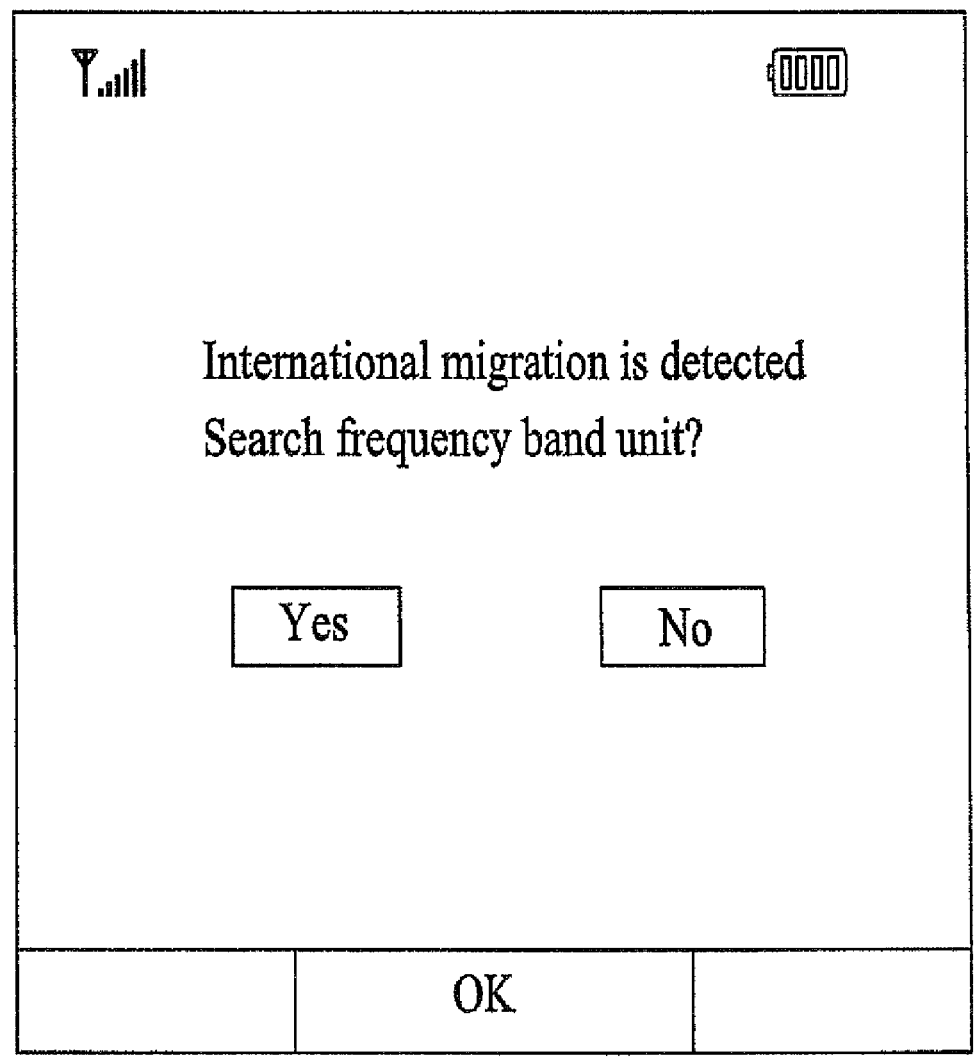
Figure 9:
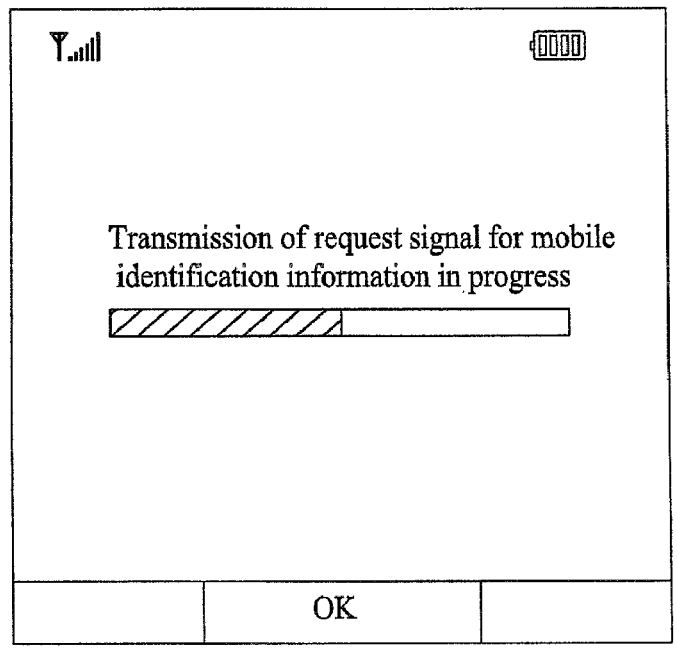
Figure 9:
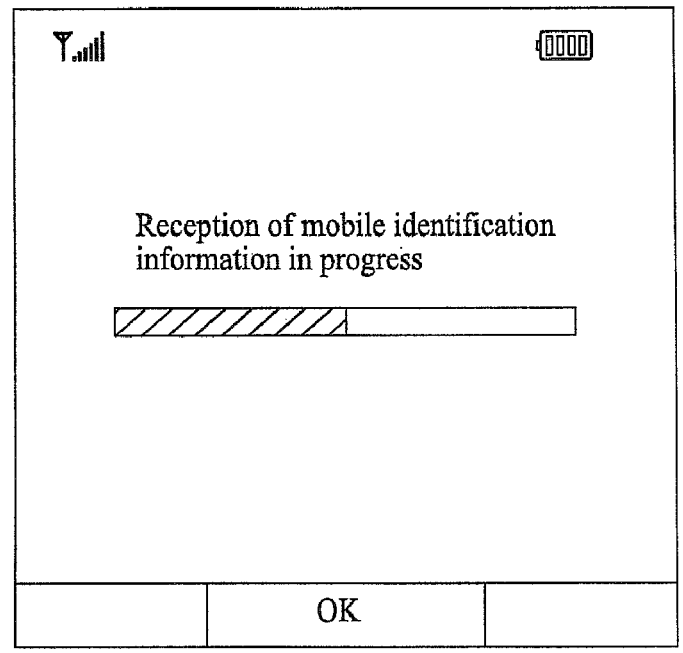
Figure 10:
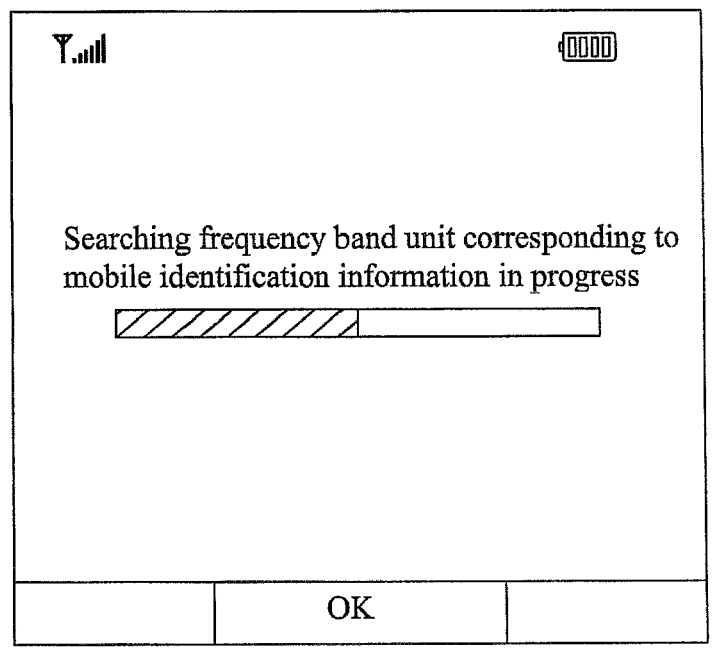
Figure 10:
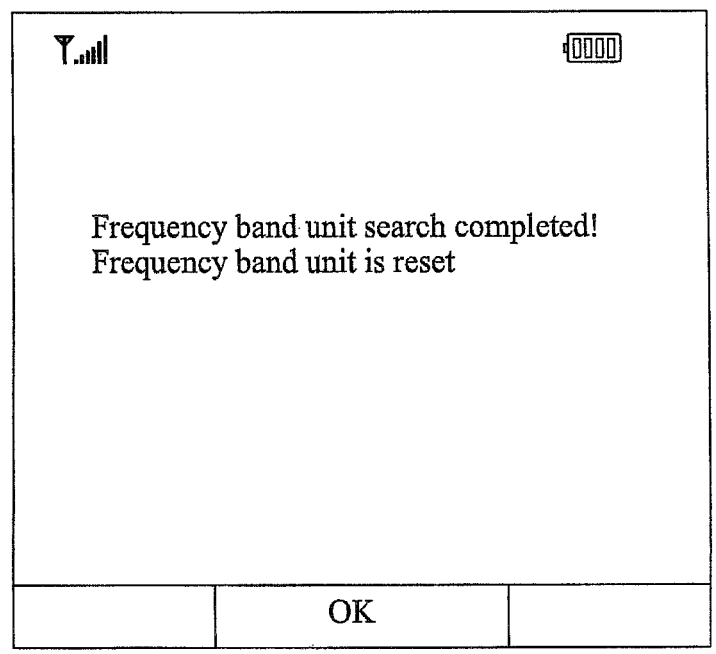

FIGS. 8A-8B show a Broadcast relevant menu. As shown in FIGS. 8A to 8C, if a user selects a 'TV viewing' 801 as an example for the broadcast mode entry via a menu search (FIG. 8A), a 'frequency band unit search/setting' 802 as an example for user's selection operation through a menu search (FIG. 8B) or a search command by a frequency band unit corresponding to a visited country (FIG. 8C), the mobile terminal 100 may search a frequency band unit corresponding to a currently located country (or a visited country).

Prior to the searching operation, the mobile terminal 100 may send a request signal for mobile country identification information as shown in FIG. 9(a) and the mobile terminal 100 may then receive the mobile country identification information of the currently located country in FIG. 9(b). In FIG. 9(a), an identifier may be displayed announcing that a transmission of the request signal for the mobile country identification information is in progress and announcing an extent of the transmission. In FIG. 9(b), an identifier may be displayed announcing that a transmission of the mobile country identification information is in process and announcing an extent of the transmission.

As the mobile country identification information corresponding to the currently located country is received, the mobile terminal 100 may search a frequency band unit corresponding to the received mobile country identification information and may display, as shown in FIG. 10(a), an identifier announcing that the search for the frequency band unit is in progress and announcing an extent of the search via the display unit 151. If the frequency band unit search is successful, the mobile terminal 100 may output a text, as shown in FIG. 10(b), indicating the search completion and the setting of the searched frequency band unit via the display unit 151.

Figure 11:
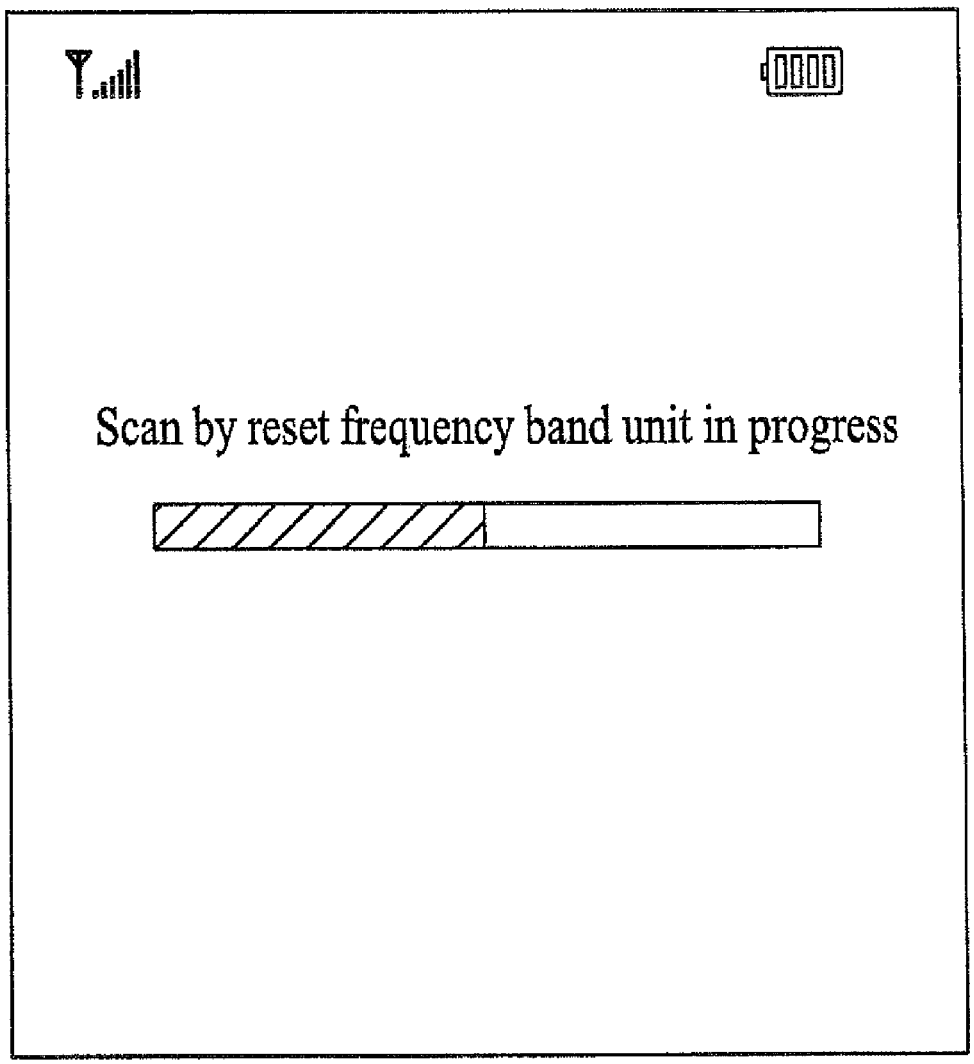
FIG. 11 is a screen configuration for a case that a frequency band unit search is successful in case of international roaming in a mobile terminal according to an example embodiment of the present invention.
Figure 12A:
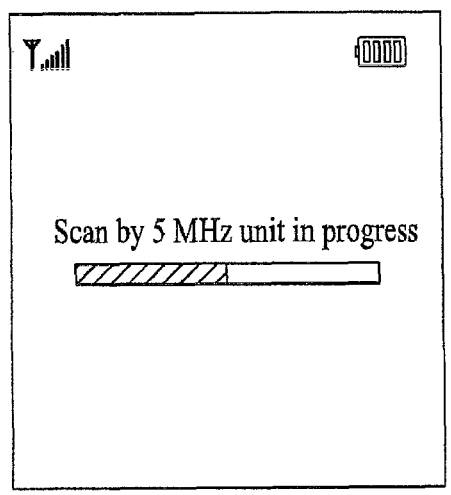
FIGS. 12A and 12B are screen configurations showing a frequency band unit search that fails in case of international roaming in a mobile terminal according to an example embodiment of the present invention.
Figure 12A:
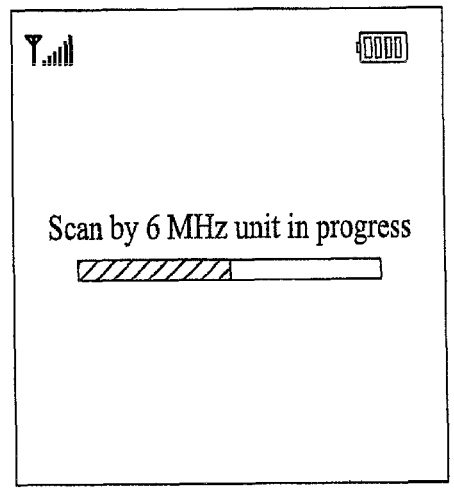
Figure 12A:
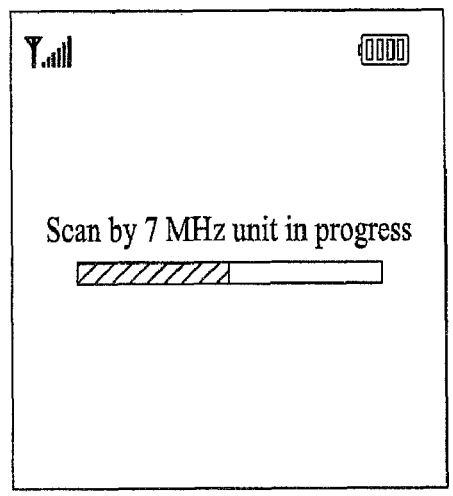
Figure 12A:
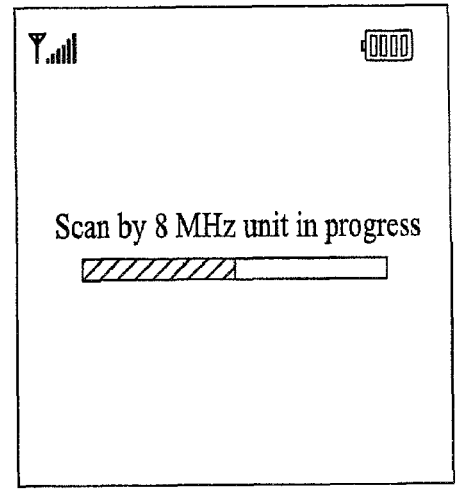
Figure 12B:
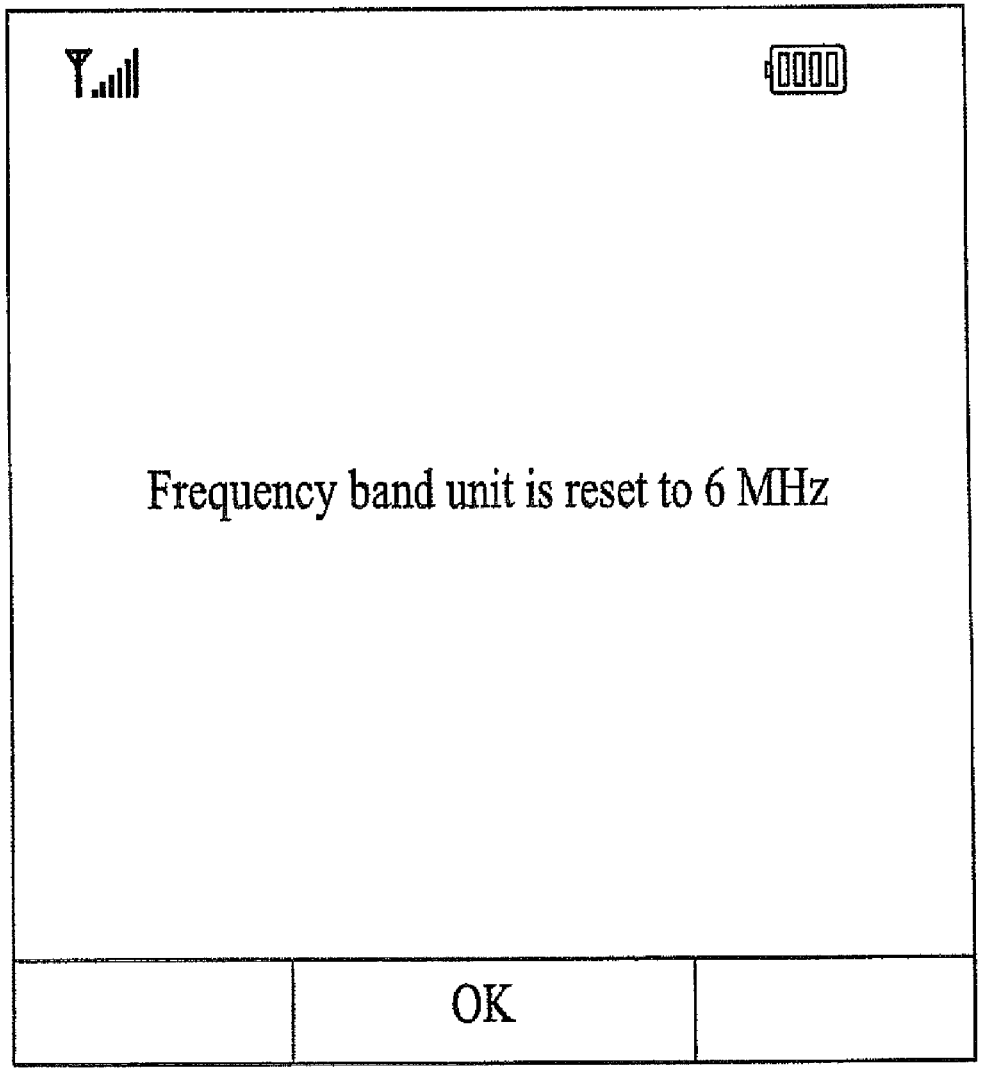

FIG. 11 is a screen configuration for a case that a frequency band unit search is successful in case of international roaming in a mobile terminal. FIGS. 12A and 12B are screen configurations showing a frequency band unit search that fails in case of international roaming in a mobile terminal.

If the search for a frequency band unit corresponding to a visited country is successful, the mobile terminal 100 may scan frequency bands by the searched frequency band unit and display an identifier, as shown in FIG. 11, indicating that a frequency band scan is in progress and indicating an extent of the scan via the display unit 151.

If the search for the frequency band unit corresponding to the visited country fails, the mobile terminal 100 may perform a frequency band scanning procedures by all settable frequency band units as shown in FIG. 12A, and the mobile terminal 100 may set the frequency band unit corresponding to the visited country to the scan-successful frequency band unit as shown in FIG. 12B.

Figure 13A:
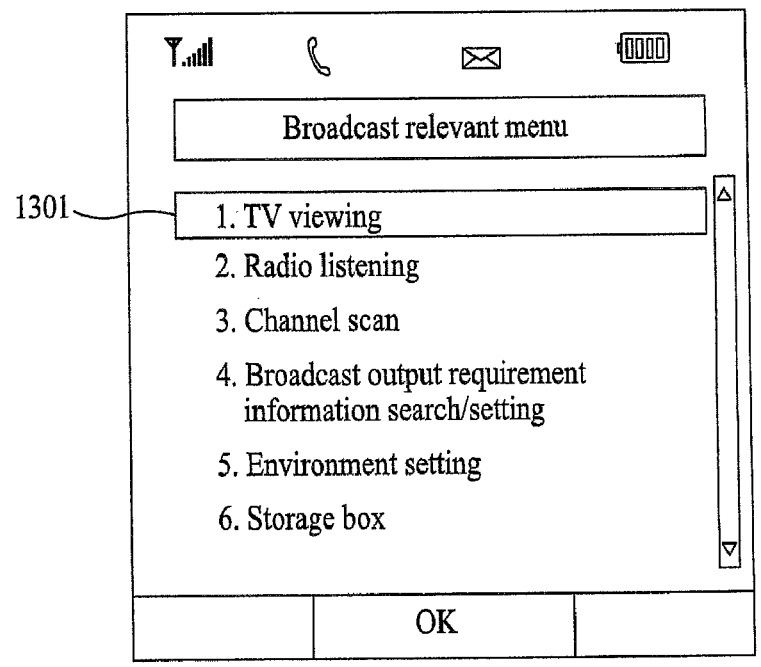
FIGS. 13A, 13B, 13C and 14 are screen configurations for searching and setting broadcast output requirement information in case of international roaming using per-country identification information in a mobile terminal according to an example embodiment of the present invention.
Figure 13B:
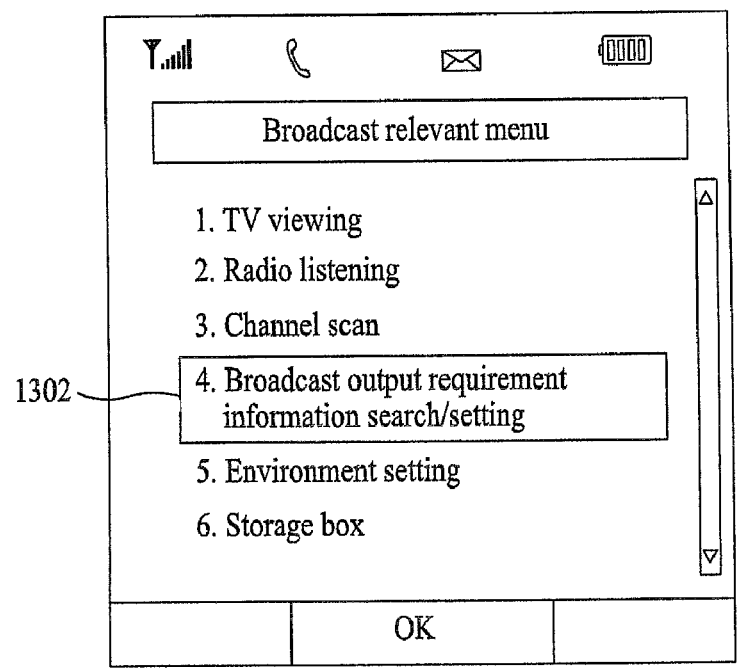
Figure 13C:
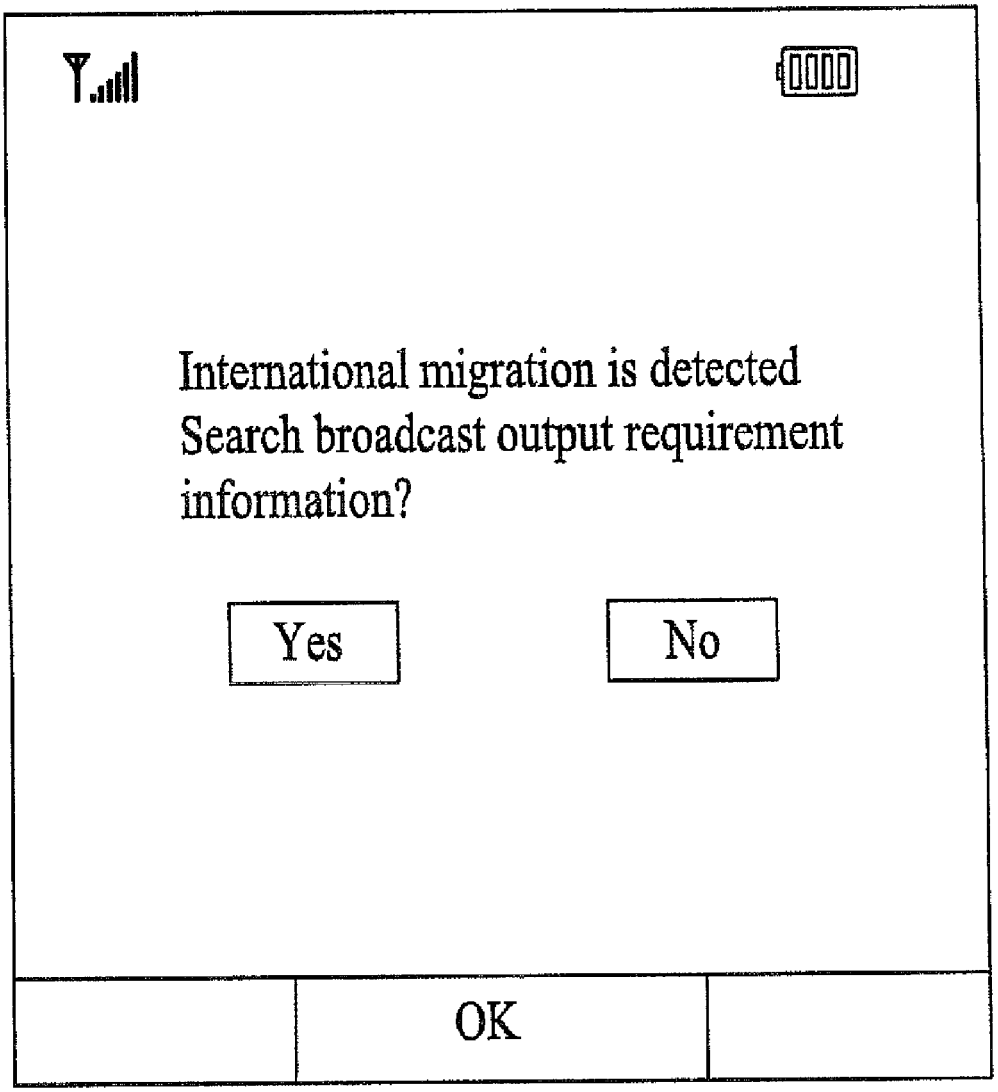
Figure 14:
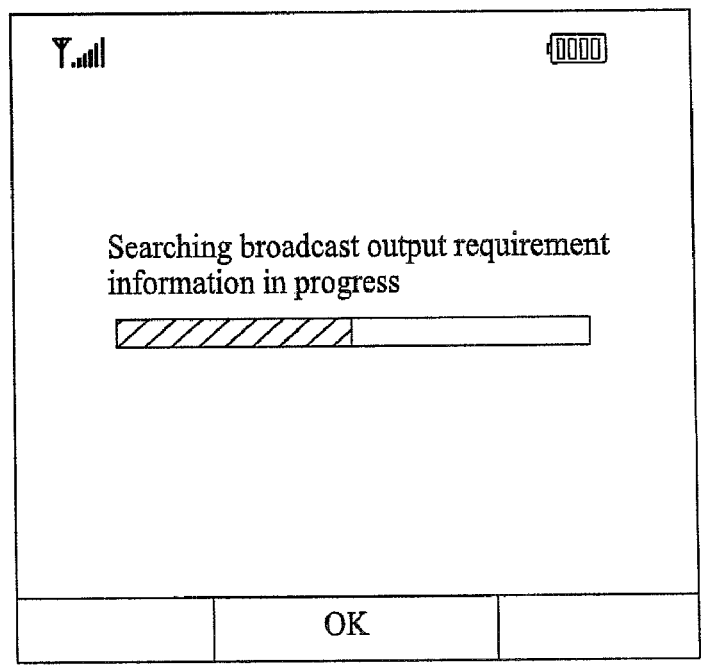
Figure 14:
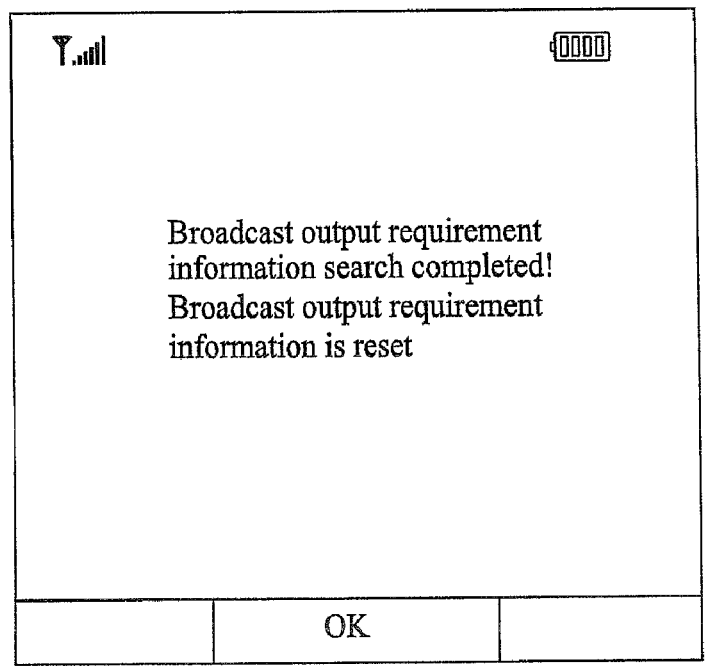

FIGS. 13A to 14 are screen configurations for searching and setting broadcast output requirement information in case of international roaming using per-country identification information in a mobile terminal. For clarity and ease of description, broadcast relevant information may be limited to broadcast output requirement information corresponding to a currently located country (or a visited country).

FIGS. 13A and 13B show a broadcast relevant menu. The mobile terminal 100 may search broadcast output requirement information corresponding to a currently located country (or a visited country) when at least one of a 'TV viewing' 1301 is selected via a menu search as an example for the broadcast mode entry (FIG. 13A), a 'broadcast output requirement information search/setting' 1302 is selected via a menu search as an example for the user's selection operation (FIG. 13B) and a search command for broadcast output requirement information corresponding to a visited country is selected by a user in case of Prior to the search operation, the mobile terminal 100 may acquire identification information of the currently located country. The acquisition of the identification information may be explained above and its details may be omitted in the following description.

The mobile terminal 100 may search the broadcast output requirement information corresponding to identification information on a currently located country and display an identifier announcing an ongoing search for the broadcast output requirement information and a search extent via the display unit 151 as shown in (a) of FIG. 14. If the search for the broadcast output requirement information is successful, the mobile terminal 100 may display a text indicating the search completion and the setting of the searched broadcast output requirement information via the display unit 151 as shown in (b) of FIG. 14.

Figure 15A:
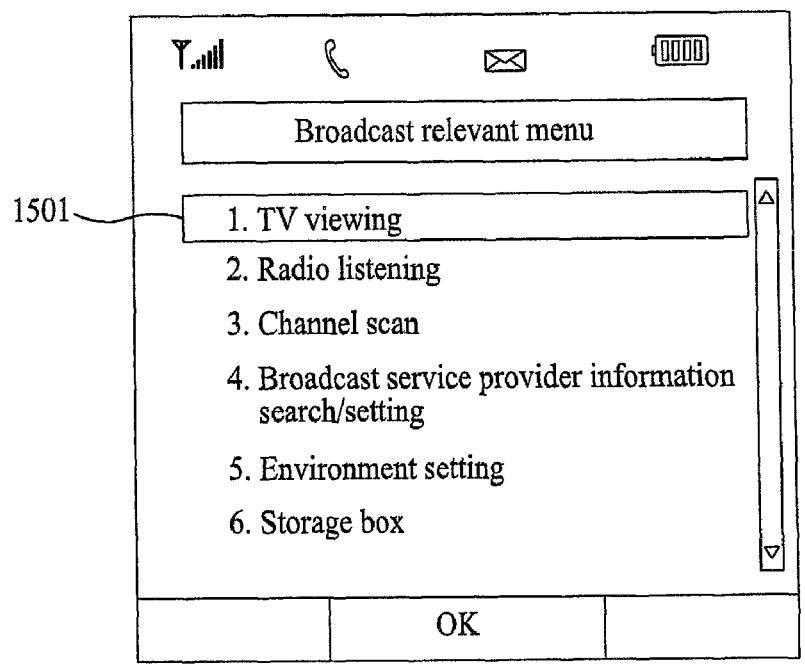
FIGS. 15A, 15B, 15C and 16 are screen configurations for searching and setting broadcast service provided information in case of international roaming using per-country identification information in a mobile terminal according to an example embodiment of the present invention.
Figure 15B:
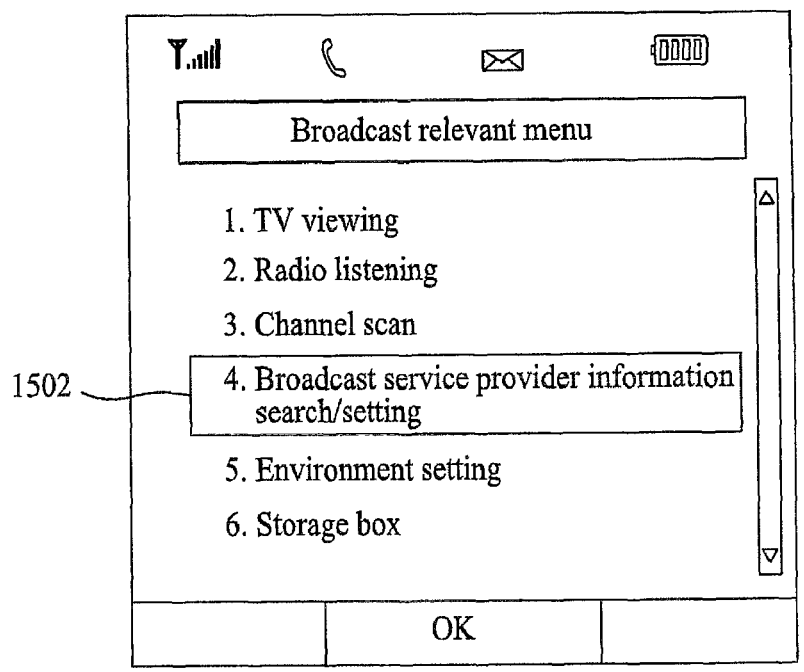
Figure 15C:
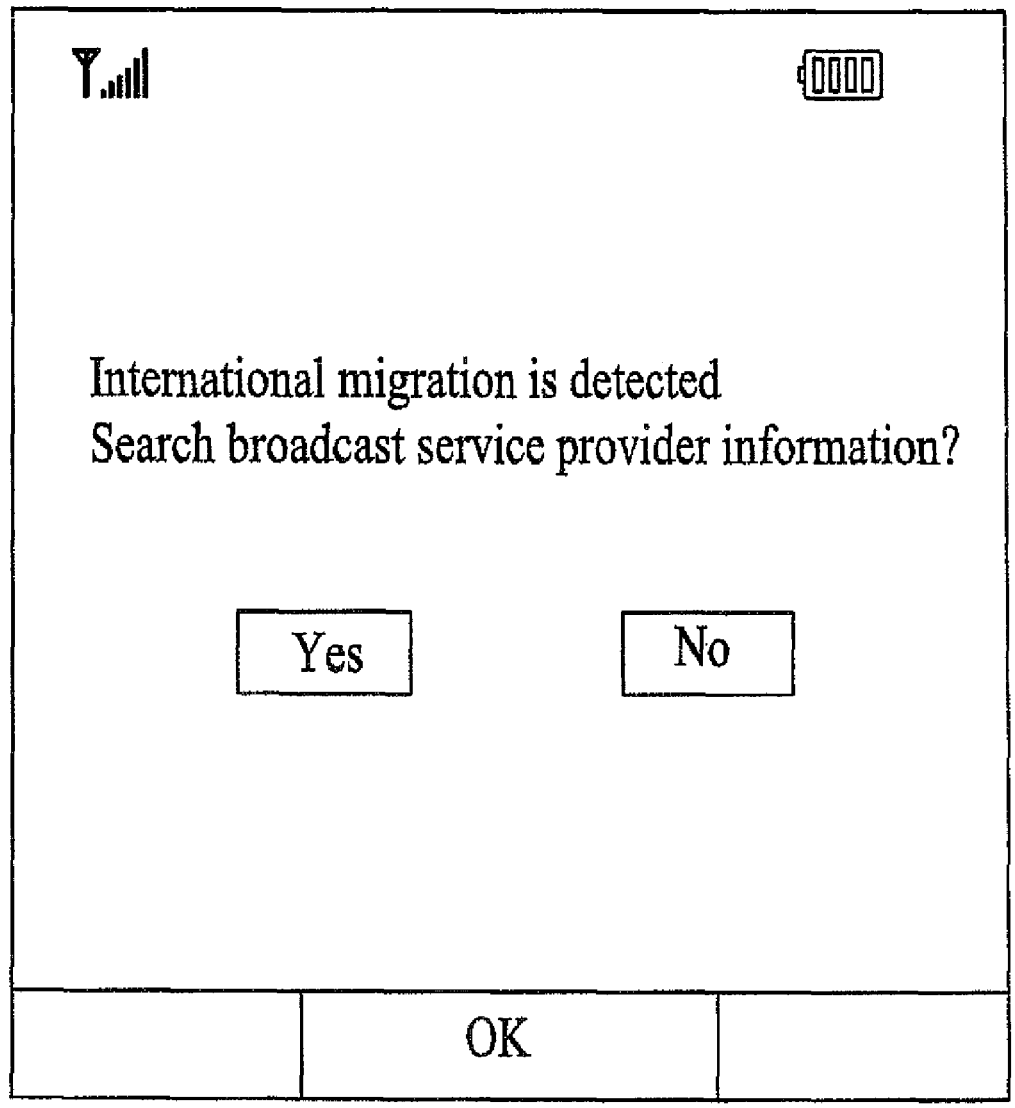
Figure 16:
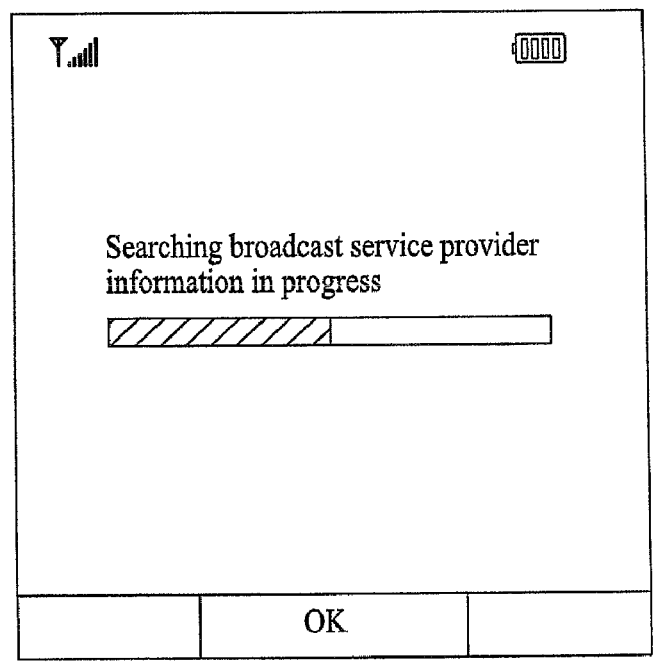
Figure 16:
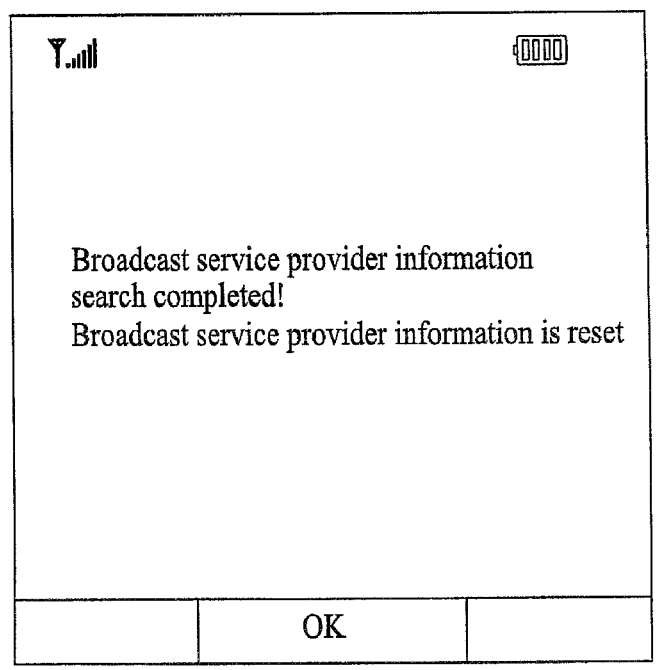

FIGS. 15A to 16 are screen configurations for searching and setting broadcast service provided information in case of international roaming using per-country identification information in a mobile terminal.

FIGS. 15A-15B show a broadcast relevant menu. The mobile terminal 100 may search broadcast service provider information corresponding to a currently located country (or a visited country) when at least one of a 'TV viewing' 1501 is selected via a menu search as an example for the broadcast mode entry (FIG. 15A), a 'broadcast service provider information search/setting' 1502 is selected via a menu search as an example for the user's selection operation (FIG. 15B) and a search command for broadcast service provider information corresponding to a visited country is selected by a user in case of international migration detection (FIG. 15C).

Prior to the search operation, the mobile terminal 100 may acquire identification information of the currently located country. The acquisition of the identification information may be explained in the foregoing description and details may be omitted in the following description.

The mobile terminal 100 may search the broadcast service provider corresponding to identification information on a currently located country and display an identifier announcing an ongoing search for the broadcast service provider information and a search extent via the display unit 151 as shown in (a) of FIG. 16. If the search for the broadcast service provider information is successful, the mobile terminal 100 may display a text indicating a search completion and setting of the searched broadcast service provider information via the display unit 151 as shown in (b) of FIG. 16.

The mobile terminal 100 may include software corresponding to each of the entire settable frequency band units individually or can include integrated software corresponding to the entire settable frequency band units.

The mobile terminal 100 may store its international migration history in the memory 160. In case that a visited country is the country having the previously located history, the mobile terminal 100 may directly recognize identification information or broadcast relevant information corresponding to the visited country.

The above-described method of controlling a broadcast in a mobile terminal may be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and may also include carrier-wave type implementations (e.g., transmission via Internet). The computer may also include the controller 180 of the terminal 100.

Embodiments of the present invention may provide effects and/or advantages. Since broadcast relevant information per country is previously stored, embodiments may quickly search and set broadcast relevant information corresponding to a visited country in case of international migration of a mobile terminal. Embodiments may quickly search and set broadcast relevant information on a currently located country, thereby providing a broadcast to a user quickly in a course of international migration. Additionally, in case of international migration, embodiments may search previously stored frequency band units settable per country for a frequency band unit corresponding to a visited country and then set the searched frequency band unit quickly. Therefore, embodiments may skip a procedure for recognizing the frequency band unit corresponding to the visited country, thereby saving time consumption.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a wireless communication unit;
a memory to store broadcast relevant information for each of a plurality of countries; and
a controller to detect movement of the mobile terminal from a first country to a second country, to search the memory for broadcast relevant information corresponding to the second country when the controller detects movement of the mobile terminal to the second country, and the controller to set the mobile terminal based on the searched broadcast relevant information,
wherein the broadcast relevant information includes a country settable frequency band unit,
wherein the controller sets the searched broadcast relevant information when the search determines that the broadcast relevant information corresponding to the second country is successfully provided in the mobile terminal,
wherein in response to a determination by the controller that the search for the broadcast relevant information corresponding to the second country fails to be stored in the mobile terminal, the wireless communication unit of the mobile terminal scans a plurality of frequency bands each by a unit of at least one settable frequency band, and the controller sets the frequency band unit corresponding to the second country based on a result of the scan of the plurality of frequency bands by the wireless communication unit of the mobile terminal, wherein the controller to control the memory to store an acquired frequency band unit corresponding to the second country according to the result of the scan of the plurality of frequency bands.

2. The mobile terminal of claim 1, wherein the controller detects the movement of the mobile terminal from the first country to the second country based on country identification information, wherein the country identification information includes at least one of country mobile country identification information, a country code, country GPS information and a country name.

3. The mobile terminal of claim 1, wherein the wireless communication unit to transmit a request signal for mobile country identification information of the second country in response to a control signal of the controller and receives the mobile country identification information of the second country in response to the transmitted request signal, wherein the controller searches the memory for the broadcast relevant information corresponding to the received mobile country identification info nation.

4. The mobile terminal of claim 1, wherein the controller searches the memory for the broadcast relevant information corresponding to acquired identification information of the second country.

5. The mobile terminal of claim 1, wherein the controller performs one of the detecting, the searching and the setting based on one of a broadcast mode entry, a user's selection operation input, a country migration detection and a broadcast viewing unavailability.

6. The mobile terminal of claim 1, wherein the wireless communication unit scans the plurality of frequency bands by a set frequency band unit according to a control signal of the controller when the broadcast relevant information is a frequency band unit corresponding to the second country.

7. A method of controlling a broadcast in a mobile terminal, comprising:
detecting movement of the mobile terminal from a first country to a second country;
searching previously stored country broadcast relevant information, including a country settable frequency band unit, for broadcast relevant information corresponding to the second country;
setting the searched broadcast relevant information in the mobile terminal when the searching successfully determines that country broadcast relevant information exists in the mobile terminal;
in response to a controller of the mobile terminal determining that country broadcast relevant information corresponding to the second country fails to exist in the mobile terminal, the mobile terminal scans a plurality of frequency bands each by a unit of at least one settable frequency band; and setting the frequency band unit corresponding to the second country based on a result of the mobile terminal performing the scanning of the plurality of frequency bands, and storing the acquired frequency band unit corresponding to the second country based on the result of the scanning of the plurality of frequency bands.

8. The method of claim 7, wherein the detecting is performed using country identification information, wherein the country identification information includes at least one of country mobile country identification information, a country code, country GPS information and a country name.

9. The method of claim 7, further comprising:
transmitting a request signal for mobile country identification information of the second country; and
receiving the mobile country identification information of the second country in response to the transmitted request signal,
wherein the searching comprises searching the broadcast relevant information corresponding to the received mobile country identification information.

10. The method of claim 7, further comprising acquiring identification information of the second country,
wherein the searching comprises searching the broadcast relevant info nation corresponding to the acquired identification information.

11. The method of claim 7, wherein one of the detecting, the searching and the setting is performed based on one of a broadcast mode entry, a user's selection operation input, a country migration detection and a broadcast viewing unavailability.

12. The method of claim 7, further comprising scanning the plurality of frequency bands by a set frequency band unit when the broadcast relevant information is a frequency band unit corresponding to the second country.

13. A method of controlling a mobile terminal, comprising:
detecting movement of the mobile terminal from a first geographical region to a second geographical region by using region identification info nation, wherein the region identification information includes one of region mobile country identification info nation, a region country code, region country GPS information and a region name;
searching previously stored region broadcast relevant information for broadcast relevant information corresponding to the second geographical region;
setting the searched broadcast relevant information in the mobile terminal when the searching for the broadcast relevant information corresponding to the second geographical region is successful;
when the searching for the broadcast relevant information corresponding to the second geographical region is unsuccessful, the mobile terminal scans a plurality of frequency bands each by a unit of at least one settable frequency band; and
setting the frequency band unit corresponding to the second geographical region based on a result of the scanning of the plurality of frequency bands by the mobile terminal, and storing an acquired frequency band unit corresponding to the second geographical region based on the result of the scanning of the plurality of frequency bands by the mobile terminal.

14. The method of claim 13, wherein the detecting is performed using region identification information, wherein the region identification information includes one of region mobile country identification information, a region country code, region country GPS information and a region name.

15. The method of claim 13, further comprising scanning the plurality of frequency bands by a set frequency band unit when the broadcast relevant information is a frequency band unit corresponding to the second geographical region.

* * * * *